US012591355B1

(12) United States Patent
VanAntwerp et al.

(10) Patent No.: US 12,591,355 B1
(45) Date of Patent: Mar. 31, 2026

(54) METHOD AND SYSTEM FOR ADMINISTERING DYNAMIC USER EXPERIENCE APPLICATIONS

(71) Applicant: STATE FARM MUTUAL AUTOMOBILE INSURANCE COMPANY, Bloomington, IL (US)

(72) Inventors: John M. VanAntwerp, Normal, IL (US); Dan Kalmes, Bloomington, IL (US); Victoria Ann Spaulding-Burford, Marietta, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 22 days.

(21) Appl. No.: 16/001,571

(22) Filed: Jun. 6, 2018

Related U.S. Application Data

(60) Provisional application No. 62/535,613, filed on Jul. 21, 2017.

(51) Int. Cl.

| | |
|---|---|
| *G06F 3/0484* | (2022.01) |
| *G06F 3/04847* | (2022.01) |
| *G06F 8/34* | (2018.01) |
| *G06F 8/35* | (2018.01) |
| *G06F 8/36* | (2018.01) |
| *G06F 9/451* | (2018.01) |
| *G06F 16/22* | (2019.01) |
| *G06F 16/9535* | (2019.01) |
| *G06Q 10/06* | (2023.01) |

(52) U.S. Cl.
CPC ........ *G06F 3/0484* (2013.01); *G06F 3/04847* (2013.01); *G06F 8/34* (2013.01); *G06F 8/35* (2013.01); *G06F 8/36* (2013.01); *G06F 9/451* (2018.02); *G06F 16/2246* (2019.01); *G06F 16/9535* (2019.01); *G06Q 10/06* (2013.01)

(58) Field of Classification Search
CPC .... G06F 3/0484; G06F 3/04847; G06F 9/451; G06F 8/34; G06F 8/36; G06Q 10/06
See application file for complete search history.

(56) References Cited

U.S. PATENT DOCUMENTS

| | | |
|---|---|---|
| 5,640,501 A | 6/1997 | Turpin |
| 6,314,415 B1 | 11/2001 | Mukherjee |
| 7,752,092 B1 | 7/2010 | Mattice et al. |

(Continued)

OTHER PUBLICATIONS

"Common SMS Problems and How to Solve Them, Part 1", Laura Schaffer, Twilio Blog, https://www.twilio.com/blog/2015/08/common-sms-problems-and-how-to-solve-them-part-1.html, Aug. 21, 2015.

(Continued)

*Primary Examiner* — William L Bashore
*Assistant Examiner* — Sajeda Muhebbullah
(74) *Attorney, Agent, or Firm* — Lee & Hayes, P.C.

(57) ABSTRACT

A method of administering dynamic user experience applications includes a user-initiated query wherein the user-initiated query includes one or more paths and/or one or more steps, and wherein the user-initiated query includes an operation. The method may include executing the operation with respect to the one or more paths and/or the one or more steps, transmitting an output of executing the operation to the user, and displaying the output of executing the operation to the user.

20 Claims, 12 Drawing Sheets

(56) References Cited

U.S. PATENT DOCUMENTS

| | | | |
|---|---|---|---|
| 7,818,341 B2 | 10/2010 | Kurien et al. | |
| 9,086,914 B2 | 7/2015 | Bolohan et al. | |
| 11,069,001 B1 | 7/2021 | Mascaro et al. | |
| 2002/0161911 A1 | 10/2002 | Pinckney, III et al. | |
| 2004/0015578 A1 | 1/2004 | Karakashian et al. | |
| 2004/0163037 A1 | 8/2004 | Friedman et al. | |
| 2004/0230636 A1* | 11/2004 | Masuoka | G06F 9/451 |
| | | | 708/800 |
| 2006/0005140 A1* | 1/2006 | Crew | G06Q 10/06316 |
| | | | 715/760 |
| 2006/0069605 A1* | 3/2006 | Hatoun | G06Q 10/0633 |
| | | | 705/7.26 |
| 2006/0074735 A1* | 4/2006 | Shukla | G06F 8/34 |
| | | | 705/80 |
| 2006/0161272 A1* | 7/2006 | Haller | G06Q 10/06 |
| | | | 700/29 |
| 2007/0271521 A1 | 11/2007 | Harriger et al. | |
| 2008/0077530 A1* | 3/2008 | Banas | G06Q 10/06 |
| | | | 705/50 |
| 2008/0154935 A1* | 6/2008 | Draeger | G06F 8/34 |
| 2011/0004590 A1* | 1/2011 | Lilley | G06Q 10/06 |
| | | | 707/723 |
| 2011/0282941 A1 | 11/2011 | Chan et al. | |
| 2012/0303756 A1 | 11/2012 | Bolohan et al. | |
| 2013/0036367 A1 | 2/2013 | DeRoos et al. | |
| 2013/0152001 A1 | 6/2013 | Lovitt et al. | |
| 2013/0158964 A1* | 6/2013 | Hall | G06Q 10/0633 |
| | | | 703/3 |
| 2013/0159228 A1 | 6/2013 | Meijer et al. | |
| 2013/0173719 A1 | 7/2013 | Ahmed et al. | |
| 2014/0047028 A1* | 2/2014 | Buth | G06F 9/546 |
| | | | 709/204 |
| 2014/0122497 A1 | 5/2014 | Eigner et al. | |
| 2014/0229898 A1 | 8/2014 | Terwedo | |
| 2015/0074615 A1 | 3/2015 | Han et al. | |
| 2016/0147729 A1 | 5/2016 | Sivertson et al. | |
| 2016/0147828 A1 | 5/2016 | Yu et al. | |
| 2016/0259534 A1* | 9/2016 | Simons | G06F 3/0482 |
| 2016/0275627 A1 | 9/2016 | Wang et al. | |
| 2016/0283889 A1 | 9/2016 | Shukla et al. | |
| 2017/0039046 A1* | 2/2017 | Henke | G06Q 10/0631 |
| 2017/0132200 A1* | 5/2017 | Noland | G06Q 10/06 |
| 2017/0161855 A1* | 6/2017 | Schreyer | G06Q 50/167 |
| 2017/0220963 A1 | 8/2017 | Canaran et al. | |
| 2017/0264566 A1 | 9/2017 | Namboodiri et al. | |
| 2017/0315782 A1 | 11/2017 | Chaudhry et al. | |
| 2017/0315789 A1* | 11/2017 | Lam | G06Q 10/067 |
| 2017/0316363 A1 | 11/2017 | Siciliano et al. | |
| 2017/0322782 A1 | 11/2017 | Pakiman et al. | |
| 2017/0344895 A1 | 11/2017 | Roy | |
| 2017/0357627 A1 | 12/2017 | Peterson et al. | |
| 2018/0108093 A1 | 4/2018 | Podgorny et al. | |
| 2018/0210619 A1 | 7/2018 | Mowatt et al. | |
| 2018/0321830 A1* | 11/2018 | Calhoun | G06F 8/38 |
| 2019/0355351 A1 | 11/2019 | Kim et al. | |
| 2022/0286531 A1 | 9/2022 | VanAntwerp et al. | |
| 2023/0141866 A1 | 5/2023 | VanAntwerp | |
| 2023/0208943 A1 | 6/2023 | VanAntwerp | |

OTHER PUBLICATIONS

Non Final Office Action dated May 29, 2020 for U.S. Appl. No. 16/001,643 "Method and System of Generating Generic Protocol Handlers" VanAntwerp, 12 pages.

Office Action for U.S. Appl. No. 16/001,602, mailed on Mar. 4, 2020, VanAntwerp, "Method and System for Optimizing Dynamic User Experience Applications", 19 pages.

Office Action for U.S. Appl. No. 16/001,629, mailed on Apr. 3, 2020, VanAntwerp, "Method and System for Reconciling User Interactions", 8 pages.

Office Action dated Jan. 7, 2021 for U.S. Appl. No. 16/001,629, "Method and System for Reconciling User Interactions", VanAntwerp, 9 pages.

Final Office Action dated Jul. 23, 2020 for U.S. Appl. No. 16/001,629, "Method and System for Reconciling User Interactions", VanAntwerp, 9 pages.

Office Action for U.S. Appl. No. 16/001,629, mailed on Jul. 9, 2021, VanAntwerp, "Method and System for Reconciling User Interactions", 14 Pages.

Office Action dated Mar. 2, 2021 for U.S. Appl. No. 16/001,602 "Method and System for Optimizing Dynamic User Experience Applications" VanAntwerp, 20 pages.

Office Action for U.S. Appl. No. 16/001,602, mailed on Sep. 2, 2021, VanAntwerp, "Method and System for Optimizing Dynamic User Experience Applications", 25 pages.

Herbst, et al., "Integrating Machine Learning and Workflow Management to Support Acquisition and Adaption of Workflow Models", retrieved Dec. 2021, at <<https://onlinelibrary.wiley.com/doi/pdf>>, 2000, pp. 67-92.

Office Action for U.S. Appl. No. 16/001,629, mailed Dec. 21, 2021, VanAntwerp, "Method and System for Reconciling User Interactions" 14 pages.

Office Action for U.S. Appl. No. 17/222,221, mailed on Jun. 30, 2022, VanAntwerp, "Method and System of Generating Generic Protocol Handlers", 6 pages.

Office Action for U.S. Appl. No. 16/001,629, mailed on Jul. 21, 2022, VanAntwerp, "Method and System for Reconciling User Interactions", 14 Pages.

Office Action for U.S. Appl. No. 17/750,554, mailed on Apr. 25, 2023, VanAntwerp, "Method and System for Generating Dynamic User Experience Applications", 21 pages.

Office Action for U.S. Appl. No. 16/001,629, mailed on Jan. 3, 2023, VanAntwerp, "Method and System for Reconciling User Interactions", 11 pages.

Office Action for U.S. Appl. No. 16/001,629, mailed on Dec. 8, 2023, John M. VanAntwerp, "Method and System for Reconciling User Interactions", 15 pages.

* cited by examiner

Figure 2:
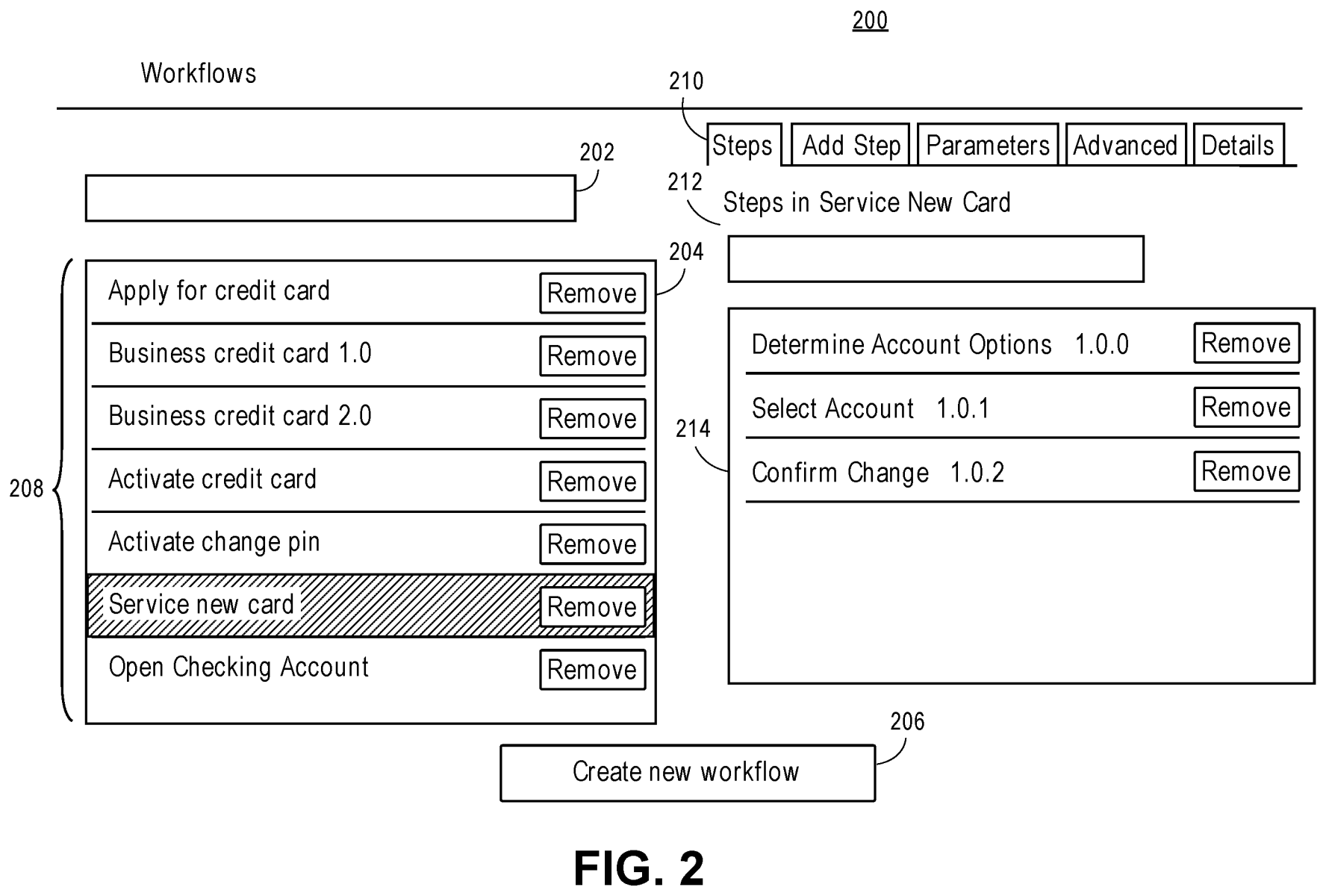

200

210

Steps | Add Step | Parameters | Advanced | Details

212    Steps in Service New Card

214

Determine Account Options   1.0.0    Remove

Select Account   1.0.1    Remove

Confirm Change   1.0.2    Remove

202

Workflows

204

Apply for credit card    Remove

Business credit card 1.0    Remove

Business credit card 2.0    Remove

Activate credit card    Remove

Activate change pin    Remove

Service new card    Remove

Open Checking Account    Remove

208

206

Create new workflow

Figure 4:
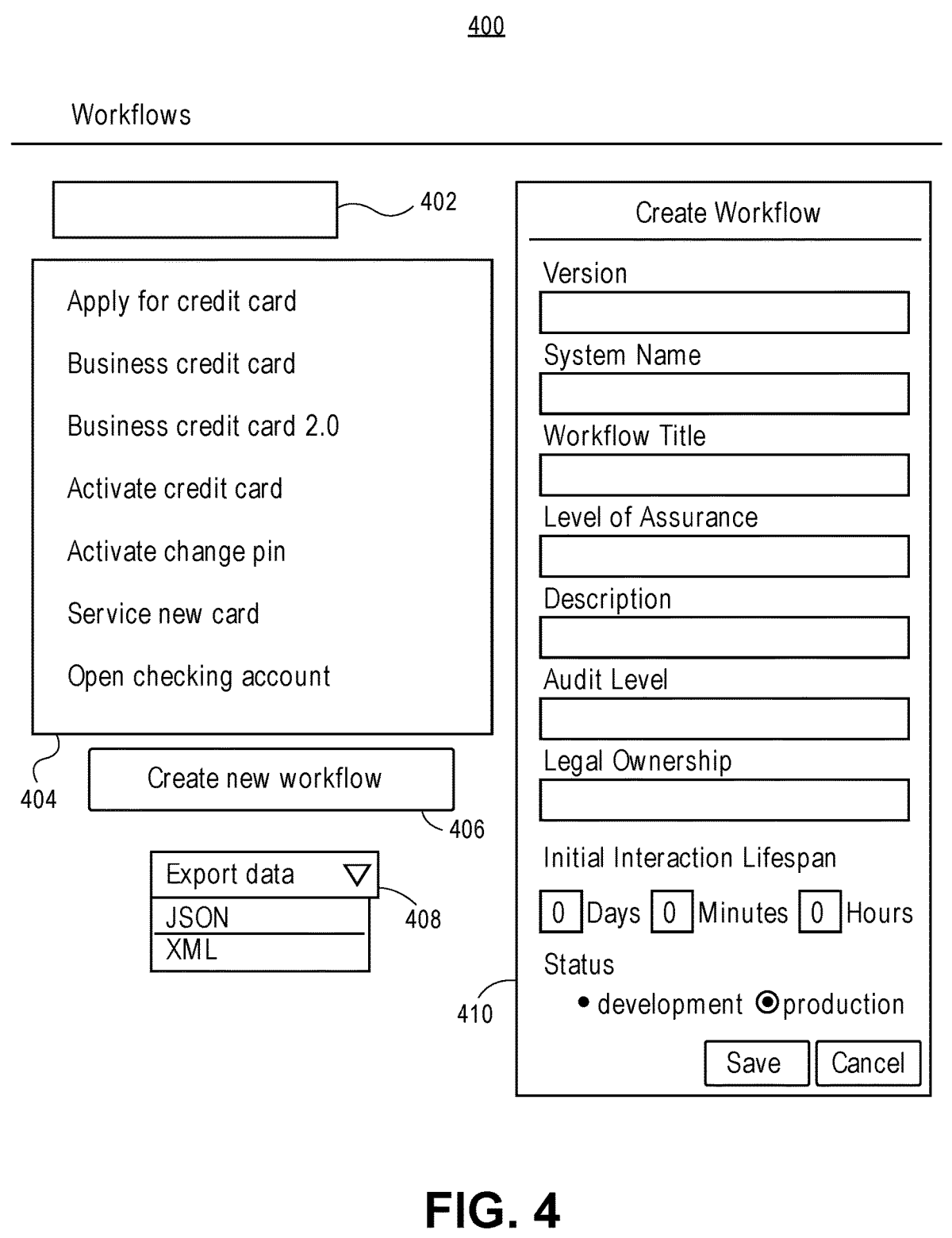

Workflows

| 402

Apply for credit card

Business credit card

Business credit card 2.0

Activate credit card

Activate change pin

Service new card

Open checking account

404

Create new workflow

406

Export data  ▽
JSON
XML

408

Create Workflow

Version

System Name

Workflow Title

Level of Assurance

Description

Audit Level

Legal Ownership

Initial Interaction Lifespan

[0] Days [0] Minutes [0] Hours

Status

• development ◉ production

410

Save    Cancel

Canonical Resources

600

Create Canonical Type ～ 602

Name:        | Authorized User |  ～ 604

Description:  | Authorized User |  ～ 606

Required:    | Y/N |  ～ 608

Implementation Class:    bank.credit.authorizedUser ～ 610

Create Step Parameter ～ 702

| 704 | 706 | 708 |
|---|---|---|
| Step Parameters | Add Parameters | Step Details |

Name:        | Authorized User |  ～ 710

Canonical Type:  | Please Select One        ▽ |  ～ 712

| Authorized User |  ～ 714

Required ☐

| Save | Cancel |

Step Parameters    Add Parameters    Step Details

Parameters in Age Certification    810 authorizedUser ................................................................    Remove    812a userAge ................................................................    Remove    812b

1200

RECEIVE USER-INITIATED REQUEST INCLUDING
A PATH, A STEP, AND AN OPERATION
1202

EVALUATE THE OPERATION WITH RESPECT TO
THE PATH AND THE STEP
1204

TRANSMIT THE RESULT OF THE EVALUATION
TO USER
1206

DISPLAY RESULT OF THE EVALUATION TO USER
1208

METHOD AND SYSTEM FOR ADMINISTERING DYNAMIC USER EXPERIENCE APPLICATIONS

CROSS-REFERENCE TO RELATED APPLICATION

The present application claims priority to U.S. Provisional Application No. 62/535,613, filed Jul. 21, 2017. The priority application is hereby incorporated by reference.

TECHNICAL FIELD

The present invention generally relates to systems and methods for administering dynamic user experience applications, in particular, to techniques for assembling and programming dynamic user experience applications.

BACKGROUND

Administrative user interfaces for managing applications are well known in the art. Administrative user interfaces are used in many computer software applications to display graphics and text, and to allow users to interact with applications. For example, an application may consist of an application, which a front-end user may use to add data to a system, and which an administrative, or back-end, user may use to manage the data added by the front-end user. A backend user interface may allow an administrative user to edit text added by a front-end user, to retrieve information added by a user, to update the text, or delete the text. There may be very little difference between the static administration tool used by a backend user to manage application data, and the static web tool used by a front-end user to add new data. For example, a frontend user may use the same forms as the backed user that to apply for a credit account via a frontend user interface, wherein the only difference is styling applied to the forms presented to the front-end user. Administrative user interfaces are useful for allowing users of frontend and backend web services to make changes to data associated with a static web site, or content that is displayed by a static application.

One problem associated with traditional administrative user interfaces is that they are typically constructed by a software developer enumerating a central data model and then manually assigning required input fields to the central data model. The developer creates an electronic form with inputs that correspond to those of the central data model, wherein each form may correspond to one or more phases of the application process, and the phases may be statically joined together in a pre-determined order. The developer may then define a form processing program that accepts input from the electronic form and processes it. Changes to the data model, forms, and processing logic may require non-trivial technical developer intervention. In general, traditional administrative user interfaces focus on the administration of data, and not the administration of applications. In traditional administration applications, if another product is to be developed, duplicate functionality may need to be designed. Simply put, the data entry and data processing aspects of a first application cannot be reused in a second application, and must be rebuilt from scratch. Because the data entry and data processing aspects may be tightly coupled, they may not be independently adjusted, reordered, or refactored. Also, the administrative user interfaces may only be used to make changes to static content. A side effect of traditional static development user interfaces is that non-technical developers (e.g., Business Analysts) are not able to perform dynamic user experience tasks; i.e., to define business applications or digital experiences, or to implement business applications.

Accordingly, there is a need for intuitive tooling to allow all primary user groups to easily define information required to accomplish a business process, individual steps for collecting and processing the information, and paths which hold the individual step chains together to form an overall business objective, while still remaining decoupled and reusable. In addition, there is a need for the intuitive tooling to allow for the definition of user experience rules which allow portions of the presentation of the information to dynamically flex and change.

BRIEF SUMMARY

In one aspect, a method for administering dynamic user experience applications includes receiving a user-initiated query in a remote computing system wherein the user-initiated query includes one or more paths, and/or one or more steps, and wherein the user-initiated query includes an operation. The method may further include executing the operation with respect to the one or more paths, and/or the one or more steps, transmitting an output of executing the operation to a device of the user, and displaying the output of executing the operation in the device of the user.

In another aspect a computing system including one or more processors and one or more memories storing instructions is provided. When the instructions are executed by the one or more processors, they cause the computing system to receive a user-initiated query, wherein the user-initiated query includes one or more paths, and/or one or more steps, and wherein the user-initiated query includes an operation. The instructions may further cause the computing system to execute the operation with respect to the one or more paths, and/or the one or more steps, transmit an output of executing the operation to a device of the user, and display the output of executing the operation in a device of the user.

BRIEF DESCRIPTION OF THE FIGURES

The figures described below depict various aspects of the system and methods disclosed herein. It should be understood that each figure depicts an embodiment of a particular aspect of the disclosed system and methods, and that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 2 depicts a user interface for administering workflows including administering steps, according to an embodiment;

FIG. 4 depicts a user interface for administering workflows, according to an embodiment;

FIG. 6 depicts a user interface for creating canonical types, according to an embodiment;

FIG. 7 depicts a user interface for administering step parameters, according to an embodiment;

DETAILED DESCRIPTION

I. Overview

Figure 1:
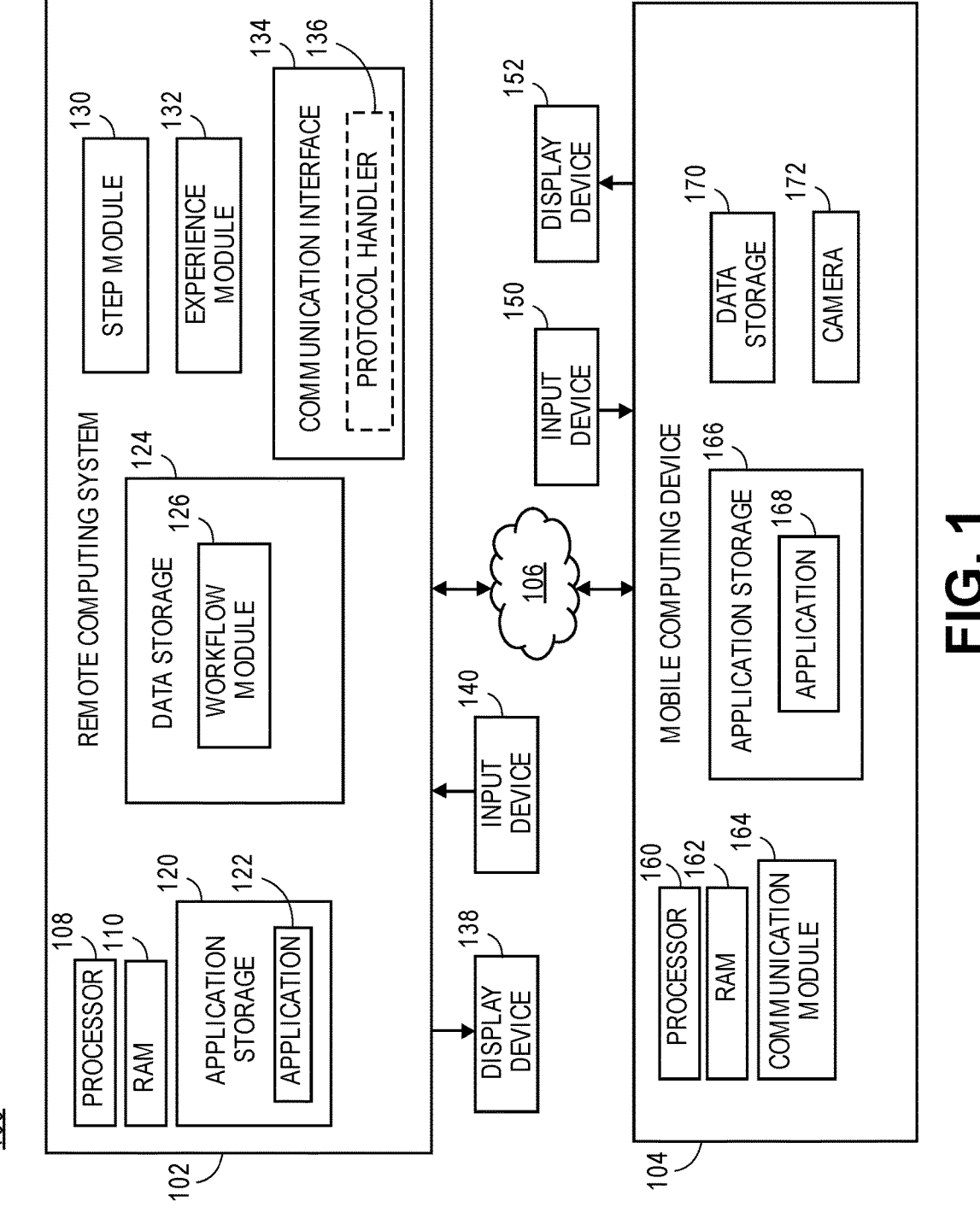
FIG. 1 depicts an environment in which the administration of dynamic UX applications may be administered, according to an embodiment.

The embodiments described herein relate to, inter alia, methods and systems for administering dynamic user experience (UX) applications. More specifically, in some embodiments, a client application is provided to a mobile computing device (e.g., a laptop, server, smartphone, wearable device, etc.) of a user. The client application may allow the user to construct a dynamic user experience application. The client application may cause the mobile computing device to access a remote computing device (e.g., a server), and may transmit instructions or messages to the remote computing device which cause a path management application, or workflow manager application, along with associated steps, to be created, modified, and/or stored in the remote computing device. Herein, the terms "path" and "workflow" may be used interchangeably. The path management application may create and/or modify canonical resources on the remote computing device, and may cause the canonical resources to be associated with the paths and/steps. The steps may define information necessary to accomplish a business goal, and the paths and/or steps may be associated with rules or other modules which may determine how the steps are displayed in the mobile computing device.

As used herein, the term "workflow" or "path" may refer, generally, to a portion of a business process that may require human interaction. For example, "collect user personal information" may be the business process corresponding to a step. Human interaction may include collection of data, approval of information presented to the user, etc. A business process may comprise one or more workflows, and workflows may be reused and shared among business processes. The reusability of workflows and steps is a primary benefit of the methods and systems described herein. Workflows and steps may be reused across organizations that do not share common owners to build a consistent user experience. For example, a workflow may be used by two corporations A and B, wherein A and B have no common shareholders. Workflows may be deployed in applications, in production and/or development environments. A workflow, or path, may comprise state information and/or metadata. For example, each workflow may include a current step pointer, which corresponds to the step within the workflow that the user is in the process of completing. A ratio of the number of steps that the user has completed to the total number of steps within a workflow may be computed by a workflow manager. A report may be obtained from the workflow manager specifying which steps are complete and the respective completion state of each one. Workflows may maintain step references, rules governing workflow version adoption, and workflow auditing requirements. Each step reference may refer to a step and upstream dependencies of a step. Each step reference may connect available step canonical properties to the business step parameters for a workflow. The information specified by the step reference may be used by a workflow manager to notify an experience manager to notify properties, and which properties should be discovered. Each step in the workflow may be associated with a step reference that represents the step. Workflow state may be captured in records known as interactions which may be associated with users. For example, state information with respect to a user's use of a credit card application workflow may be encapsulated into an interaction.

Paths, or workflows, may be executable (e.g., by a client application and/or server application) and may comprise a series of executable steps. Steps within a workflow may be ordered by the sequence in which they are presented to the user, and may repeat (e.g., in a workflow execution loop). Steps may be shared between workflows to allow for modularity and creation of new workflows from existing steps. Workflow steps may obtain the information necessary to execute their business rules from business capability services (e.g., from APIs which provide information) or other locations (e.g., from a user). Steps may contain, or cache, data internally that may be necessary for their respective execution. Steps may be externalized (i.e., run in an external rule engine). Steps may be executed in parallel for performance reasons, and may be executed in multi-pass, and/or recursively. The execution time of steps may be tracked and traced for profiling or other purposes. Steps may or may not be individually secured components; therefore, the decision of whether or not a user is authorized to access a step may be made by a component separate from a step. Workflows and steps may be executed based on user roles—for example, a workflow may be executed differently depending on whether the accessing user is an agent, customer, or a customer service representative.

Steps may be reusable building blocks (e.g., "register a customer"). Generally workflows correspond to business processes, (e.g., "credit card application") and steps may encapsulate business rules which form part of the workflow (e.g., "collect applicant's home address"). A step may be an individual executable component of a path. Each step may maintain properties required for its execution and its current internal state. A step may be associated with a step type. Types of steps may include active state, address standardization, always complete, basic info, and others. In practice, steps may be implemented in any suitable manner (e.g., as Java classes deployed in a Jar file within an application). Steps may include or be associated with step parameters that may be linked to one or more canonical types, which may respectively correspond to the inputs accepted (and in some embodiments, required) by the steps.

In some embodiments, steps may include prerequisites. For example, a step in which a user submits a credit card application may not be able to be completed by a user until one or more prerequisite steps are completed. This order completion requirement may be enforced by a workflow, a step, and/or a workflow runtime (e.g., a workflow manager). Similarly, some steps may be optional, in that a user may not be required to complete them to proceed to a next step. For example, a workflow may comprise an optional "cross sell"

step in which the workflow presents a user with an offer to purchase a related product, but the user's decision to reject, or not accept, the offer may not affect the user's ability to progress to the next step. The optionality and prerequisite nature of steps may be defined in workflow metadata. In this way, a given step may be optional in one workflow, but not another. In yet another embodiment, an optional step may become a required step based on information entered by the user. For example, entering information about the user's real property holdings may be optional, unless and until the user declines to enter information about the user's savings accounts. The business logic for implementing optional steps that become required may be stored within the step, according to an embodiment.

In yet another embodiment, a workflow may be used by an intake facility to digitize paper records. For example, information from a customer received via phone, agent office, mobile, and postal mail may be manually input into an appropriate workflow. The customer may then be sent a link to the workflow, and may resume working on an application with the information manually input pre-populated and available for the customer's inspection/verification. Manual input may also be used for the purposes of entering data into underwriting systems. In some embodiments, a user may switch between multiple input devices and/or protocols (e.g., from a cellular telephone to a voice-activated system) while remaining within the same workflow, and/or while interacting with the same step.

II. Example Environment for Administering Dynamic Ux Applications

With respect to FIG. 1, an example environment 100 in which dynamic user experiences may be administered is depicted, according to an embodiment. Environment 100 may include various client-side and server-side components; specifically, environment 100 may include a remote computing system 102 (equivalently "server 102", or, "server device 102") which may be coupled to a mobile computing device 104 (equivalently, "client 104", or, "client device 104") via a network 106.

Server 102 may be a single server or a group of multiple servers and multiple servers 102 may be deployed wherein each may be representative of a business API or service. Using multiple servers 102 may provide a number of benefits, including isolation between business APIs, isolation of production and testing environments, and greater availability and stability to each respective business API. Using multiple servers 102 may also provide the ability to independently tune and scale each business API, the opportunity to expose a more traditional API on a per-service basis, and may provide a business specific endpoint. Multiple servers 102 may provide tools and metrics that can be more easily aligned to business processes, and may provide each business API with the ability to be independently versioned giving consumers greater control over adoption and funding.

Alternatively, or in addition, server device 102 may be a multi-tenant device, wherein multiple business APIs may be implemented in a platform-as-a-service (PaaS) model. Advantages of implementing dynamic UX applications as PaaS may include more seamless sharing of resources between business APIs, quicker implementation of changes for multiple APIs (i.e., all instances may be changed simultaneously), and quick implementation of changes to shared resources between business APIs (e.g., business rules, common services, reusable workflow steps, etc.).

Server device 102 may include a processor 108, RAM 110, application storage 120 (e.g., one or more persistent memories), and application 122, which may include software instructions (e.g., a web stack, Android package, etc.). While referred to in the singular, processor 108 may include any suitable number of processors of one or more types (e.g., one or more central processing units (CPUs), graphics processing units (GPUs), etc.). Generally, processor 108 may be configured to execute software instructions stored in one or more memories (e.g., stored in a persistent memory such as a hard drive or solid state memory) of server device 102. RAM 110 may comprise solid state and/or transient memory and may store application storage 120, including instructions (e.g., corresponding to application 122). When processor 108 executes instructions corresponding to application 122, RAM 110 may, for example, temporarily store the instructions and data required for execution of application 122. Processor 108 may load instructions stored in application storage 120 or any other location into RAM 110. Software instructions, when executed by processor 108, may generate, create, and/or execute one or more dynamic UX applications, which may be loaded into RAM 110 or application storage 120.

Generally, server device 102 generates dynamic UX applications which may be accessed/utilized by client device 104, and processes user requests (also referred to herein as queries) to create, edit, delete, or update existing dynamic UX applications and components thereof. Portions of the dynamic UX applications generated by server device 102 may be displayed on client device 104 (e.g., by application 168 and display 152).

In some embodiments, application 122 may be part of a larger application or set of applications. Application 122 may provide code and data (e.g., a dynamic UX application) to client devices. Code and data may include a fully-formed dynamic UX application, or requests/queries used to construct, modify, and/or view a dynamic UX application or portions of a dynamic UX application displayed in a client device. For example, server device 102 may generate web pages (e.g., Hypertext Markup Language (HTML) instructions, JavaScript instructions, Java Server Pages (JSP) instructions, mobile device application, and/or any other type of instructions suitable for defining the content and presentation of the code and data), and/or may include instructions of a plug-in, extension, and/or stand-alone software component that may be downloaded by client device 104.

Generally server device 102 may provide users accessing application 122 with one or more user interfaces which may enable the users to interact with application 122, and which in turn, may modify data associated with server 102. To that end, server device 102 may transmit user interface (UI) components (e.g., style sheets, executable code, HTML or JavaScript widgets, etc.) to clients, which the clients may execute, and with which the respective users of those clients may interact. Those clients may transmit data back to server device 102 in the form of requests/queries, which may include data payloads.

Server 102 may also include data storage 124, workflow module 126, step module 130, and experience module 132. Server 102 may also include a communication interface 134 and a protocol handler 136, which, respectively, cause information to be transmitted to and from devices (including server 102) via network 106; and perform operations (translation, formatting, processing, etc.) on that information. The precise arrangement of the foregoing components may differ from that depicted in FIG. 1. For example, in some embodiments, step module 130 may be contained within data storage 124, or may reside in a separate server. In some embodiments, experience module 132 may be included in another server, in some embodiments, and an API may link experience module 132 to modules of server 102.

Data storage 124 may be composed of any suitable persistent or transient memory (e.g., a hard drive, random-access memory unit, etc.), and may store any number of modules including, without limitation, those depicted in FIG. 1. Data storage may include an electronic database (e.g. a relational database, key-value store, flat file, etc.) in which electronic records representing paths and steps may be stored, and associated. For example, a path may be stored in a one-to-one, one-to-many, or many-to-many relationship with one or more steps. A step may be stored in a similar relationship with respect to one or more canonical types. A user may configure and modify the respective relationships between workflows, steps, and canonical types using the methods and systems described herein.

Workflow module 126 may receive requests/queries, in response to which application 122 may take actions and issue responses. For example, workflow module 126 may advance the current step pointer from one step to another, for example, if workflow module 126 determines based on an analysis of the query that a step has been successfully completed. Workflow module 126 may communicate information to experience module 132. Similarly, workflow module 126 may terminate a given workflow, add a step to a path, create a path, associate one or more canonical types with a step, evaluate a step, etc. based on a respective instruction from application 122.

Generally, workflow module 126 may contain instructions for managing workflows, or paths. Workflow module 126 may include workflow metadata, such as a name, creation date and time, and unique identifier associated with each workflow. Workflow metadata may also include a list of steps associated with each respective workflow. Workflow module 126 may be communicatively coupled to a data store (e.g., an electronic database) in which workflows and steps are stored. Generally, step module 130 contains steps and instructions for executing steps. Step module 130 may include step metadata, such as a name, creation date and time, and unique identifier associated with the each step. Step metadata may include a list of workflows associated with, or which include, each respective step. Step module 130 may include, for each step therein, a list of inputs, and associated canonical types associated with each respective input.

Workflow module 126 may contain one or more workflows and may manage the execution of the workflows. Workflow module 126 may include a table of all workflows indexed by user or session, and their respective states. Workflow manager 126 may include a step with multiple resource types and steps may be executed as part of a workflow or individually. Steps may be associated with a user interface (e.g., a web form) and may log system activities (e.g., an audit log or information journal). Logging information may include debugging information (e.g., originating business context, etc.).

In general, any component may log information. For example, a user may be presented with a form that is part of a step by a client application, and may enter information into, and submit the form. Completion of the step may require the user to enter data that the client may transmit via the application. The step may process the form and, optionally, make an entry in an audit system for audit purposes. In some embodiments, a step may process its input in a client (e.g., client 104). The same form may be re-used in case a user edits or verifies information displayed in a form. Then, the data the user entered previously may be sent to the step, which may pre-populate the form. However, in this case, the step may not be re-executed if the information has not changed (i.e., if the user does not change the information). Similarly, an audit entry may not be made if the step does not re-execute. Workflows and steps may both create audit records that may include a business context (e.g., the name of a referring agent). Workflow module 126 may determine the readiness of a step for execution in response to any new information workflow manager 126 receives.

While executing/processing a particular step, workflow module 126 may launch an external application. Workflow manager 126 may return the user to the executing step when the external application closes. For example, an application may receive a step generated by workflow module 126 that launches a PDF document in a PDF reader. Other examples may include launching external applications for electronic signatures, supporting documents, and customer searches. After reviewing the PDF document, the user may close the PDF reader and the application 168 may continue executing. In an embodiment, execution of the external program may not block execution of workflow module 126 (i.e., execution of external programs may be asynchronous with respect to the execution of workflow module 126). In an embodiment, workflow module 126 may support an event-based architecture, and may provide real-time notification of events to users. In some embodiments, the workflow module 126 may prevent step information from being stored, either temporarily or permanently.

Experience module 132 may be a module that generates user experiences dynamically based on individualized UX rules defined by backend users, or generated according to an algorithm. For example, a user of an application may be presented with a different experience based on information known about the user and/or the user's activity within the application. Experience module 132 may seek to understand the customer and personalize their digital interactions with application 122 in much the same way that humans personalize human interactions with the same customers. To accomplish this, experience module 132 may fit the experience to the individual customer, determining how and when to display content based on user preference. Determining how and when to display content may be based on a runtime determination of information associated with the user or a session associated with the user. Experience module 132 may create the user experience once, in the case of a standalone application 168 delivered to a user, or may do so on a continuous/on-demand basis for applications in a server (e.g., application 122). Experience module 132 may be implemented using a suitable application framework (e.g., Ember.js).

Experience module 132 may create UX flows and request information from the user, and may send messages in canonical request format to protocol handler 136, which may in turn generate responses and send the responses to client 104. Experience module 132 may receive an indication of information source which indicates whether the information was directly entered by the user, discovered by a company service/source, retrieved from an external source (e.g., a vendor), or calculated (e.g., created by a business step). Based on the information source, experience module 132 may adjust the UX displayed to the user accordingly by, for example, presenting the user with an indication that the information was automatically populated, and encouraging the user to double-check or confirm the information. Such indications may take any suitable form (e.g., a textual message, the addition of color, the reordering of information in a table, etc.).

Experience module 132 may use information received from workflow module 126 to make UX flow decisions and to avoid problems (e.g., deadlocks). In an embodiment, experience module 132 may receive the number of steps that are remaining in workflow module 126, which have not yet been executed, and an indication of what the steps are. Experience module 132 may then determine whether to delay asking the user for information. For example, in some embodiments, another component (e.g., workflow module 126) may be unable to proceed without the information that experience module 132 wants to delay.

Experience module 132 may translate requests/queries for further information from the user made by workflow module 126 into an experience designed by experience architects. In an embodiment, behaviors and UX events may be stored within an interaction, wherein the interaction holds information about actions the user takes within the UI which can be used by experience module 132 to make decisions about which experience to deliver to the user in a given circumstance. Any user accessing application 122 may be provided with a different, or personalized, UX based on captured UX events, and other information. For example, experience module 132 may query another module for information which may be used to create a UX. Experience module 132 may learn another module that a particular user prefers a dark background in application A. Experience module 132 may then change the UX delivered to the user (e.g., a web application, standalone application, etc.) in application B to include a dark background. Experience module 132 may be associated with a content delivery network (CDN), UX rules database, and with one or more system of interaction electronic databases. Workflow module 126 may present the user with a UX that is obtained, in whole or in part, from experience module 132. For example, experience module 132 may comprise an intelligent agent which assists users in selecting auto insurance coverage. The selection of UI/UX components may be based on information experience module 132 may access regarding the workflow and user. The intelligent agent may prompt a first user to select coverage from a drop-down menu. The intelligent agent may prompt a second user to select coverage by manipulating a slider UI control. The choices of information may be the same or differ, but the presentation to the user may be personalized. The personalization (e.g., drop-down or slider) may depend on interactions that the first and second users have had previously with experience module 132. For example, a user may have responded more favorably to one UI control than another.

In an embodiment, experience module 132 may include instructions that make UX decisions based on information needed by workflow module 126. For example, if only one step remains in a path, experience module 132 may provide an indication to user that the workflow is "almost complete!". A color or other visual indication may be used to denote that the path is nearing completion. In some cases, experience module 132 may adjust components used in the UI based on the confidence level of information collected. For example, if a user provides a telephone number that contains letters, then experience module 132 may show a UI control accentuated to designate the input as possibly invalid or suspect. Experience module 132 may make UX decisions based on the number of steps that are available for execution. For example, experience module 132 may display a different UI arrangement for a workflow comprising 25 steps than one that only contains two steps. For example, in the later example, the UX may consist of a single page, whereas in the former example, two or more pages may be used.

According to an embodiment, experience module 132 may use information collected during research to present a UX that is likely to cause users to complete workflows. Information collected during research may include, for example, user survey data, user facial analysis data, or other information regarding operation of one or more applications via one or more users. For example, research may indicate that a significant amount of potential customers halt their progress through an auto quote workflow when asked, early on in the workflow, for their social security number or other personal data. Experience module 132 may use this sort of finding to determine an optimal time to present or ask for a social security data (e.g., via a particular user interface) while another module returns data that may be useful in completing the quote as far as possible before the social security data may be needed. Additionally or alternatively, experience module 132 may determine an optimal manner of presenting or requesting particular information (e.g., whether to request/receive social security data via a visual data entry field, or via audio input/output). Although some of the foregoing examples involve varying UI controls within UX (such as sliders and dropdowns), other aspects of UX may also be varied. For example, the language of messages to the user may be changed, including slang and affectation, depending on user feedback.

Protocol handler 136 may receive requests/queries from clients. Protocol handler 136 may examine requests, determine if each request is associated with a user or session, and if so, whether the user/session corresponds to an existing user/session. Sessions may be stored in a database communicatively coupled to server 102, or client 104. Protocol handler 136 may determine a network protocol and sub-protocol associated with a request, and may route the request to the workflow module 126 or another module, which may cause workflow module 126 to begin executing a workflow at a position (e.g., at a step). The position may be specified by a request, or may be associated with a user/session. In general, requests may be received by protocol handler 136 and responses may be sent by protocol handler 136. As used herein, the term "request" generally refers to an electronic request object that represents an exchange of information between a user and an application via the network 106. The terms "user request" and "request" may be used interchangeably. Requests and responses may be transferred between server 102 and clients (e.g., client 104) via a common data interchange protocol (e.g. via a representational state transfer (REST) API) or a proprietary data interchange protocol. While some of the examples herein refer specifically to requests and responses pertaining to, for example, credit card and auto insurance applications, it should be appreciated that the techniques described herein are applicable to many other types of applications. For example, a gaming application created for a mobile device may support its own form of user requests and responses. In some embodiments, requests are stateless, and in others, requests may have state. A request may be user-initiated, wherein the request is based on, or generated in response to, a direct or indirect user action. For example, a user of a user device (e.g., server 102 or client 104) may perform a click event on a form submit button using a peripheral device, or may make a selection via a capacitive touch screen, or perform any other suitable action indicating an initiation of a request. Instructions executing in the user device may process the user selection or event and, in response, generate and transmit a request (e.g., via network 106). It should be noted that in some embodiments, the user device and the remote computing system may refer to the same device (e.g., server 102), and that in other embodiments, the user device may be a client device (e.g., client 102) linked to the remote computing system via an intermediate wired and/or wireless network.

A request may include an operation, wherein the operation may include creating, retrieving, updating, and/or deleting one or more paths and/or steps. For example, the user may initiate a "CREATE" operation with respect to a path. To do so, a user may be required to enter path information by, for example, typing or otherwise entering information into a form fieldset. The operation and path information may be included in the request, and may be evaluated by workflow module 126. Executing, or evaluating, the request may include mapping the operation (e.g., UPDATE) to a corresponding method of one or more of a plurality of electronic database systems, and depending on the request type, executing the request may include providing the method with one or more evaluation parameters, which may correspond to information in the request (e.g., a path ID, step ID, user ID, etc.).

More than one protocol handler 136 may be configured, and protocol handler 136 may be integral to a client and/or server in environment 100. As stated, protocol handler 136 may receive a user request in response to behavior and events of a user (e.g., a mouse click or another event). Further, code executing in a client may cause user requests to be sent to server 102, and may receive responses, potentially unbeknownst to the user. Requests may be sent by client 104 synchronously or asynchronously with respect to the execution of code in client 104. As noted, in addition to translating requests between clients and applications, protocol handler 136 may route requests to application 122 components, and may also provide other modules with information pertaining to the capabilities of client devices. If a request type corresponds to a workflow initiation or resumption, then protocol handler 136 may route the request to workflow module 126. Upon receiving a request, workflow module 126 may determine whether to resume an existing interaction or begin a new one based on the request contents. Workflow module 126 may determine whether an interaction already exists by analyzing an indication and/or metadata from client device 104 (e.g., a UUID and/or an HTTP header). If an existing interaction is to be used, then workflow module 126 may retrieve the existing interaction. If a new interaction is to be used, then workflow module 126 may initiate a new interaction. It should be noted that a user may also decide to cancel or terminate a workflow. Also, a step may contain logic that causes a workflow to terminate if a certain condition is met, or if a particular input is provided to the step by a user (e.g., by a user of client 104). In some embodiments requests and responses may be respectively handled and issued by client device 104, either exclusively or in combination with server 102.

Server 102 may also include a display device 138 and an input device 140. Input device(s) 140 may include components that are integral to server 102, and/or exterior components that are communicatively coupled to server 102, to enable server 102 to read/retrieve inputs from the user via input device 140. For example, input device(s) 140 may include a mouse, a keyboard, a trackball device, a microphone, scanner, etc. Display device 138 may also be either integral or external to server 102, and may use any suitable display technology (e.g., LED, OLED, LCD, etc.). In some embodiments, input device(s) 140 and display device 138 are integrated, such as in a touchscreen display. Generally, input device(s) 140 and display device 138 combine to enable a user to interact with user interfaces provided by server 102, for example, user interfaces included in, or provided by, application 122.

Client 104 may be any suitable user device (PC, notebook, laptop, desktop, smart phone, or tablet) and may run any suitable operating system. Client device 104 may include one or more client user interfaces (UIs), which the user may access and interact with (e.g., via any suitable web browser). Client UIs may include software (e.g., a dynamic UX application UI including a UI web application and/or model, a UI control library, etc.) owned or controlled by the company or entity operating server 102, and the client UIs may be served to mobile computing device 104 via network 106 from remote computing system 102 (e.g., over HTTP). The client UIs may be implemented as standalone applications (e.g., as Android application packages (APK)) or as executable web code (e.g., HTML, JavaScript, and CSS). In some embodiments, a client UI may be a hybrid of application package code and executable web code. A client such as client 104 may also be referred to as a "user device".

While FIG. 1 depicts only a single client device 104, it is understood that multiple different client devices (of different entities and/or users), each similar to client device 104, may be in remote communication with server 102. Further, multiple client devices 104 of different types, which may correspond to different user cohorts, may access server 102. For example, in some embodiments, server 102 may accept requests from clients which, respectively, include backend, or administrative, users. Such users may be employees or agents of the proprietor of the methods and systems described herein, and may use client 104 and the services provided by server 102 for the purpose of defining and administering workflows/paths, steps, canonical types, and other operations (i.e., to create dynamic user experience applications for use by other users) as described above.

In the embodiment of FIG. 1, client device 104 includes an input device 150 and a display device 152. Input device(s) 150 may include components that are integral to client device 104, and/or exterior components that are communicatively coupled to client device 104, to enable client device 104 to accept inputs from the user. For example, input device(s) 150 may include a mouse, a keyboard, a trackball device, a microphone, scanner, etc. Display device 152 may also be either integral or external to client device 104, and may use any suitable display technology (e.g., LED, OLED, LCD, etc.). In some embodiments, input device(s) 150 and display 152 are integrated, such as in a touchscreen display. Generally, input device(s) 150 and display 152 combine to enable a user to interact with user interfaces provided by client device 104, for example, client UIs.

Client device 104 may also include a processor 160, a random-access memory (RAM) 162, a communication module 164, and an application storage 166. Application storage 166 may include application 168. Client device 104 may also include a data storage 170 and a camera 172. Processor 160 may include any suitable number of processors and/or processor types. Processor 160 may include one or more CPUs and one or more graphics processing units (GPUs), for example. Generally, processor 160 may be configured to execute software instructions stored in application storage 166 (e.g., client UIs in application 168).

Application storage 166 may include one or more persistent memories (e.g., a hard drive and/or solid state memory), and store a number of applications including, for example, a web browser application implementing application 168, in an embodiment. Application 168 may be a web application, or an application of a different type, such as a standalone executable, distributed mobile application, etc. Data storage 170 may include one or more persistent memories, and generally stores data used by applications stored in application storage 166. For example, data storage 170 may store local copies of steps or other code/data downloaded from server device 102.

Data stored in application storage 166, application 168, and data storage 170 may be loaded into RAM 162 when processor 160 executes instructions stored in application storage 166. Instructions implementing application 168 may be downloaded to application storage 166, and when processor 160 executes application 168, for example, RAM 162 may temporarily store the instructions and data required for its execution while application 168 displays the dynamic UX application on display 152 or otherwise operates on the dynamic UX application. When the user of application 168 uses application 168 to access server device 102, scripts, applications, and/or other instructions of server device 102 (e.g., instructions associated with workflow module 126 and step module 130) may be stored as local copies in RAM 162. Application 168 may load components and data from remote computing system 102, such as user interface components, and application data, into RAM 162, and may store such components and data locally (e.g., in data storage 170). Data storage 170 may include persistent or transient storage devices, including magnetic and/or solid-state storage devices.

Mobile computing device 104 may transmit user requests to remote computing system 102 via network 106. Requests may include data and metadata indications (e.g., a universally unique identifier (UUID) or other identifier), and may be triggered by a user action (e.g., via a user interaction with input device 150) or by the occurrence of a condition (e.g., code in application 168). A request or query may include an indication of one or more workflows/paths, and or associated steps. A request may include a tree data structure, wherein each workflow, or path, is a node comprising a plurality of other nodes and/or leaves (i.e., leaf nodes). A leaf node may be a node with no children, or a node with no back links. A node may represent a path, a step, or a sub-step (e.g., a step that includes additional steps). The entire tree of nodes may be downloaded from server 102, modified in client 104, and then uploaded to server 102. In some embodiments, a tree may be a specific type of tree, such as a binary tree, red-black tree, etc. When a path including steps is evaluated, evaluation may proceed according to a modified breadth-first search or depth-first search algorithm, or another tree-traversal algorithm.

In some embodiments, a client application (e.g., client 168) may modify the state of paths and steps within the overall system. Further, client device 104 may decorate requests with an indication of the type of request. For example, the request may be designated as a business resource request, a user information request, a workflow information request, a behavior and UX event, etc. Communication between client device 104 and server device 102 may be implemented using a secure transfer protocol such as HTTPS.

In operation, a backend user may open application 168 in a web browser or as a standalone application (e.g., in a mobile device, laptop, etc.). The user may be presented with a list of paths and steps, which may be pre-loaded into the application 168, or retrieved via communication module 164, network 106, and communication interface 134. The list of paths and steps may be presented to the user in any suitable format, and may be retrieved by the user submitting a request to a remote computing server, such as server 102. The request submitted by the user may include an indication of one or more paths, and the remote computing system may select a set of active paths and respective associated steps based on the indication of one or more paths. The indication of one or more paths may be a simple list of identifiers corresponding to a path, such as integers, or a more complex indication, such as a nested structure. The set of active steps may be transmitted to a user device, wherein the user device is a client device other than the remote computing server, or wherein the user device is the remote computing server. That is, the user may be using the remote computing server directly by input and display devices directly coupled to the remote computing server, such as via display device 138 and input device 140, or indirectly, via a client device and network, such as mobile computing device 104 and network 106.

In some embodiments, paths may be stored in a tree wherein the nodes of the tree correspond to paths and the leaves of each node represent sub-paths, and wherein each path includes one or more steps that may themselves be arranged in a tree, according to some embodiments. Path and steps information may be presented to the user in display 152 and the user may be able to modify any aspect of the state of the list of paths and steps by interacting with one or more input devices, such as input device 152. Path and steps may be transmitted to the user device as described above in a nested data structure, such as a hash map or any other suitable data structure which allows a hierarchical arrangement of paths with respect to steps to be preserved, and processed/displayed by a client application, such as application 168.

In an embodiment, a first set of paths, each associated with a respective first set of one or more steps may be received in a user device, and may be displayed to a user. The user may be allowed to make changes to the first set of paths, each associated with a respective first set of one or more steps to create a second set of paths, each associated with a respective second set of one or more steps. The changes may be any suitable changes to a workflow or step. For example, any attribute of a single workflow or step may be modified (e.g., the name). The legal information of a workflow or step may be changed. The relationship between steps and/or workflows may be changed, and so forth. Steps may be copied from one workflow to another, deleted, and/or modified. User actions (e.g., events captured from peripheral devices) causing such changes may be known as user indications. In response to a user indication, the second set of paths, each associated with a respective second set of one or more steps may be transmitted to a remote computing device (e.g., server 102). In some embodiments, the remote computing device may be the user device. The second set of paths each associated with a respective second set of steps may also be executed by the user. The execution may be initiated by a backend user for the purpose of testing the workflow before deploying the second set workflow and its steps to a production environment. As is the case in all embodiments herein, execution of a path or workflow may include recursive execution of all steps within that path, in addition to resolution of dependencies between steps.

The list, tree, or other arrangement of paths and steps may be modified, by the user adding a new path or step. In doing so, the user may be presented with input fields corresponding to a path title, version, level of authorization, etc. Steps being created may include a similar group of input fields. Steps may also include step logic, or rules, which the user may enter as a group of parameters, operators, and operands.

The step logic may be executed at the time that the step is executed, to validate, transform, or process inputs. When the user creates a new step, the application may include a facility for the user to create step rules associated with the step, including a facility for the user to include third party services that the step may call. The user may also specify one or more return values that the step may issue to a code or application executing the step. A step and the step's one or more respective step operators and step operands may be associated together in an electronic database.

The paths and steps list may also be modified by the user modifying an existing path or step. Modifying a path may include the user reorganizing the steps within the path, marking the path as active/inactive, changing an attribute of the path (e.g., the legal ownership with which the path is associated), etc. Steps may also be deleted from a path, duplicated amongst and within paths, and entire paths may be deleted, with or without cascading deletion of steps associated with the path being deleted. The user may also define relationships between steps, such as the hierarchical ordering of steps within a path tree, in some embodiments, or the linear ordering of steps in some other embodiments. The user may define dependencies between steps, in that a step A must be presented to the user, and valid output obtained, before a step B may be presented to the user. Such dependence may be represented using an appropriate data structure (e.g., a stack or an acyclic graph/tree), in an electronic database or in a memory such as data storage 124.

Once the user has configured the paths, steps, and canonical types, the user may select a default user experience with which to associate a path and/or one or more steps within the path. Available user experiences may be published by experience module 132, and may specify both the look and feel, ordering and arrangement, and tone/content of information delivered to users via the execution of steps within a path.

The user may create multiple versions of paths and steps, which may be executed at different times, based on conditional criteria (e.g., the identity of the user, the time of day, randomly, according to a schedule, etc.). The user of the administrative tool making changes to paths and steps may, but need not necessarily, be an employee of the proprietor of the methods and systems described herein. For example, the user may be a business analyst, user experience analyst, technical developer, etc. In some embodiments, technical users may construct steps, and non-technical users may build paths. In some embodiments, paths and steps may include logic preventing information from one business unit from being accessible in another, due to regulatory and or legal/compliance issues.

In some embodiments, multiple administrative user interfaces may exist, wherein a first administrative user interface exists for defining steps and workflows that are used to generate dynamic UX applications, and a second administrative user interface exists for managing the user experience that will apply to those defined steps and workflows when they are generated and/or accessed by client devices. It should be appreciated that in some embodiments, the user interface components displayed to users are completely uncoupled from the paths and steps represented by the user interface components, in that a user never specifies whether a particular step will use, for example, a drop-down list in HTML to solicit a user selection. Rather, a user may define a step as requiring a user selection from a list through the administrative user interface application 122, and another component (e.g., experience module 132) may determine the graphical user interface component(s) that will be used to accomplish the collection of the needed information, at the time the step is executed. Not only may the controls be subject to runtime determination by experience module 132, but also the ordering and frequency of information collection may be determined by experience module 132.

Network 106 may provide connectivity between server 102 and client 104, in some embodiments. Network 106 may be a single communication network, or may include multiple communication networks of one or more types (e.g., one or more wired and/or wireless local area networks (LANs), and/or one or more wired and/or wireless wide area networks (WANs) such as the Internet). Server device 102 may be accessible by multiple networks, for example by a company intranet and the Internet. Customers may be granted access to a portion of server device 102 (e.g., a bank credit card application) via the internet, whereas business partners, agents, and employees of the proprietor of server device 102 may be granted broader, or narrower, access to portions of server device 102 (e.g., to a path editor or experience editor). Access to additional services may be similarly granted or restricted by the proprietor of server device 102 on any suitable basis.

III. Example User Interfaces for Administering Dynamic Ux Applications

Turning to FIG. 2, an exemplary backend UI 200 for managing dynamic user experience applications is depicted, according to an embodiment. UI 200 may include a search field 202, a remove button 204, a create button 206, and a path list 208. Path list 208 may include a number of paths, or workflows, which may correspond to business processes. One or more of the paths in path list 208 may be selected. For example, in the depicted embodiment, the path entitled "Service new card" is selected. Paths may be selected via any suitable input selection mechanism, such as a mouse click, keyboard entry, or a touch screen gesture. For example, user UI 200 may be displayed in display device 152, and a user input selection may be accepted via input device 150. When the user selects a path, a step display 210 may be displayed. Step display 210 may include a number of tabs or other organization features which subdivide areas of interest. For example, as depicted, step display 210 includes a pane for listing the steps corresponding to the selected path, a pane for adding a step, a pane for specifying step parameters, an advanced pane, and a details pane. A user may select any of the panes for corresponding information pertaining to the selected path. In the depicted embodiment, the step display 210 includes a step title and search 212 pane and a step list 214. Step list 214 includes each of the steps comprising the selected path, along with respective version information and step management buttons. Step management buttons may include options to remove or edit steps from the path. Clicking a remove button 204 may cause a request/query to be transmitted to a remote computing system, such as remote computing system 104, which may include an indication of a delete operation, in addition to one or more paths/workflows to delete. The backend server 104 may, in response to the request, evaluate the operation, passing the ID of the one or more paths as a parameter. This evaluation may have the effect of deleting the paths from an electronic database, and the result of a successful or unsuccessful evaluation may be transmitted to a client device 102 in which the environment 200 is being embodied, and may be displayed to the user. The steps list 214 may indicate that when the selected path is executed, the steps shown in the list will be executed in the displayed linear order. The steps may be reordered by the user, for example, by the user dragging and dropping one of the steps in step list 214 to another vertical position. By using environment 200, a user may perform any management task involving any workflow and any path in the system.

Figure 3:
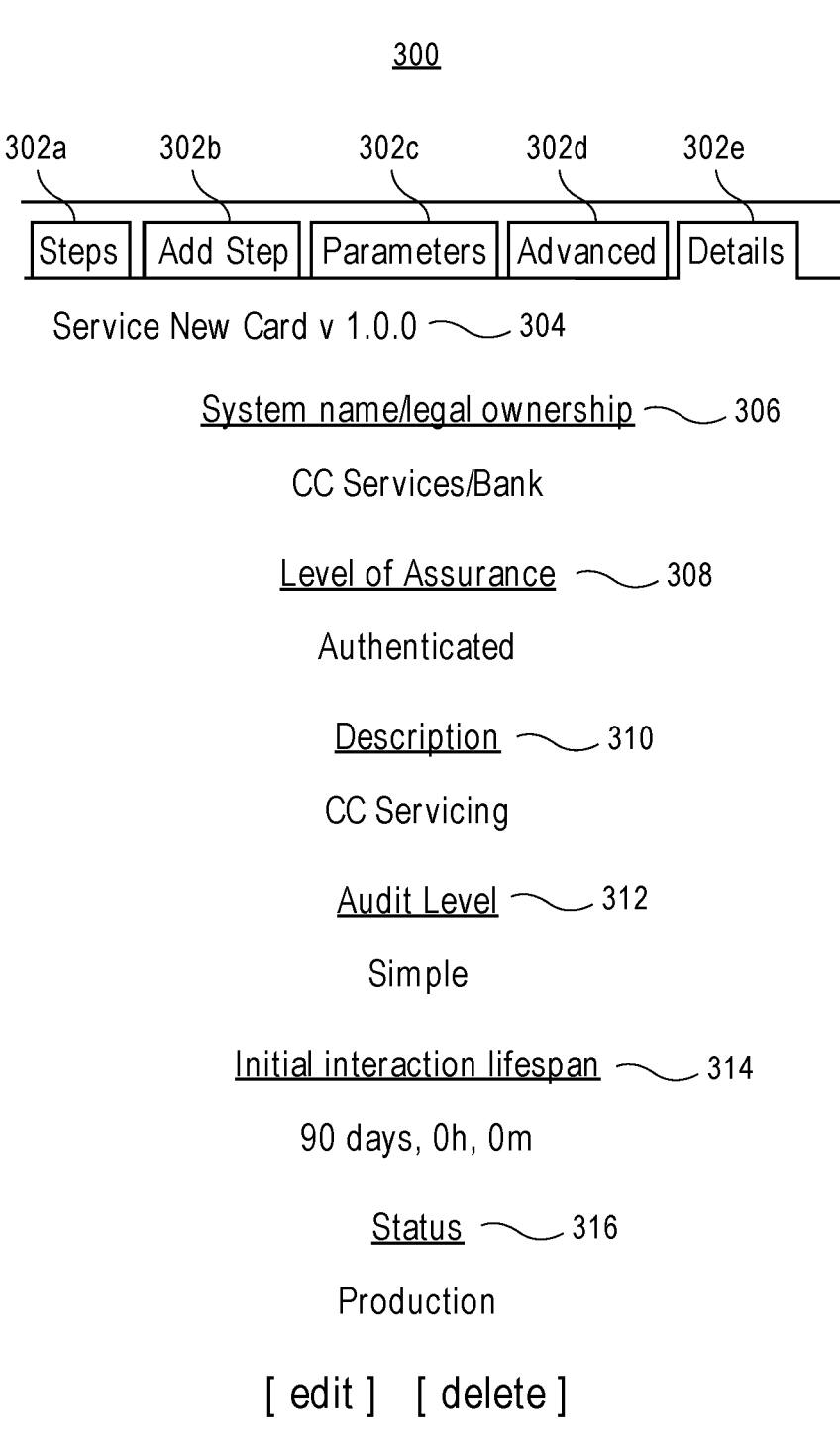
FIG. 3 depicts a user interface for administering steps associated with a workflow, according to an embodiment.

With respect to FIG. 3, an exemplary backend UI 300 for managing workflow details is depicted, according to an embodiment. UI 300 may include a number of panes 302a-302c, which may correspond to the tabs in step display 210 of FIG. 2. The panes 302a-302e may be individually selectable by the user, and selecting a pane may display information corresponding to the each respective pane title. For example, the selected pane in UI 300 may be 302c. Path details pane 302c may include a plurality of fields and components, such as a path title and version 304 field, a path legal information 306 field, a path level of assurance 308 field, a path description 310 field, a path audit level 312 field, a path lifespan 314 field, a path status 316 field, and action buttons allowing the path to be edited or deleted. Any information relating to a path may be included in the path details pane 302e. Path legal information 306 may be a field displaying which systems and/or entities the path is currently associated with. For example, a path may be associated with the credit card services portion of a bank entity. This association may help with organizing paths. In some embodiments, path legal information 306 may be read-only or only available to be changed by a system administrator— in this way, access to use certain paths may be controlled within an organization comprising multiple divisions and/or legal entities. For example, an insurance wing of a company may not be able to use a "CC Services/Bank" path. Path level of assurance 308 may specify a minimum level of assurance a user accessing the path must achieve before the user is able to access the path. Therefore, paths may be individually permissioned to ensure that appropriate access has been attained. Path lifespan 314 may include a period of time, such as 90 days, after which the path may become inactivated (i.e., a time beyond which the user may no longer access/complete the path). In some embodiments, path lifespan 314 may be very small (e.g., seconds or minutes). Path lifespan 314 may be used by a component (e.g., workflow module 126, or a system of interaction) to determine whether the path is still valid. If the path creation time is past the path lifespan 314, then the path may be expired. Path status 316 may indicate whether a path is a production path or a development path, or a path in another stage of maturity. Depending on path status 316, a path may not be available for assignment to a dynamic user experience application (e.g., application 122 or application 168 may reject the path). In some embodiments, paths may be data that is signed with cryptographic keys. For example, a cryptographic key may be used to sign each path, and a client application (e.g., application 168) may check the respective signature of each path prior to executing the path. A unique key may be used to sign each path, thereby allowing a client application to determine not only the status of a given path, but the veracity of the information contained within the path.

FIG. 4 includes an exemplary backend UI 400 for creating and editing paths. UI 400 may include a search field 402, which may allow a user to search the list of paths 404. A create button 406 may be included, in addition to export facility 408. The export facility 408 may allow a user of the backend UI 400 to download a data file containing one or more paths and associated steps in a variety of formats (e.g., JSON, XML, etc.). A create workflow fieldset 410 may be generated in a client device (e.g., client 104) in response to a user activating a button (e.g., create workflow button 206 or create workflow button 406). The create workflow fieldset

410 may contain individual fields corresponding to those in step details 302e. A user of backend UI 400 may save or cancel the step after filling in the information in fieldset 410, using a suitable data entry means, such as input device 140 or input device 150. When a user completes fieldset 410 and presses the "Create" button, a request may be initiated to a remote computing device, such as server 102, and the request may include an indication of the workflow/path (e.g., an ID, name, etc.) and an indication of any steps associated with the path. The request to create the new path/workflow may be evaluated by the remote computing device and the result of the evaluation transmitted to the client device in which the create workflow fieldset 410 is being displayed, and may be displayed to the user. For example, a list of workflows including the newly-created workflow may be displayed, and/or, an indication that the new workflow was successfully created may be displayed to the user. Editing of a path may function in a similar manner, except rather than a new path/workflow being created by evaluation, an existing workflow may be first selected, and then second, its information updated with the corresponding information in the user-initiated request/query.

Figure 5:
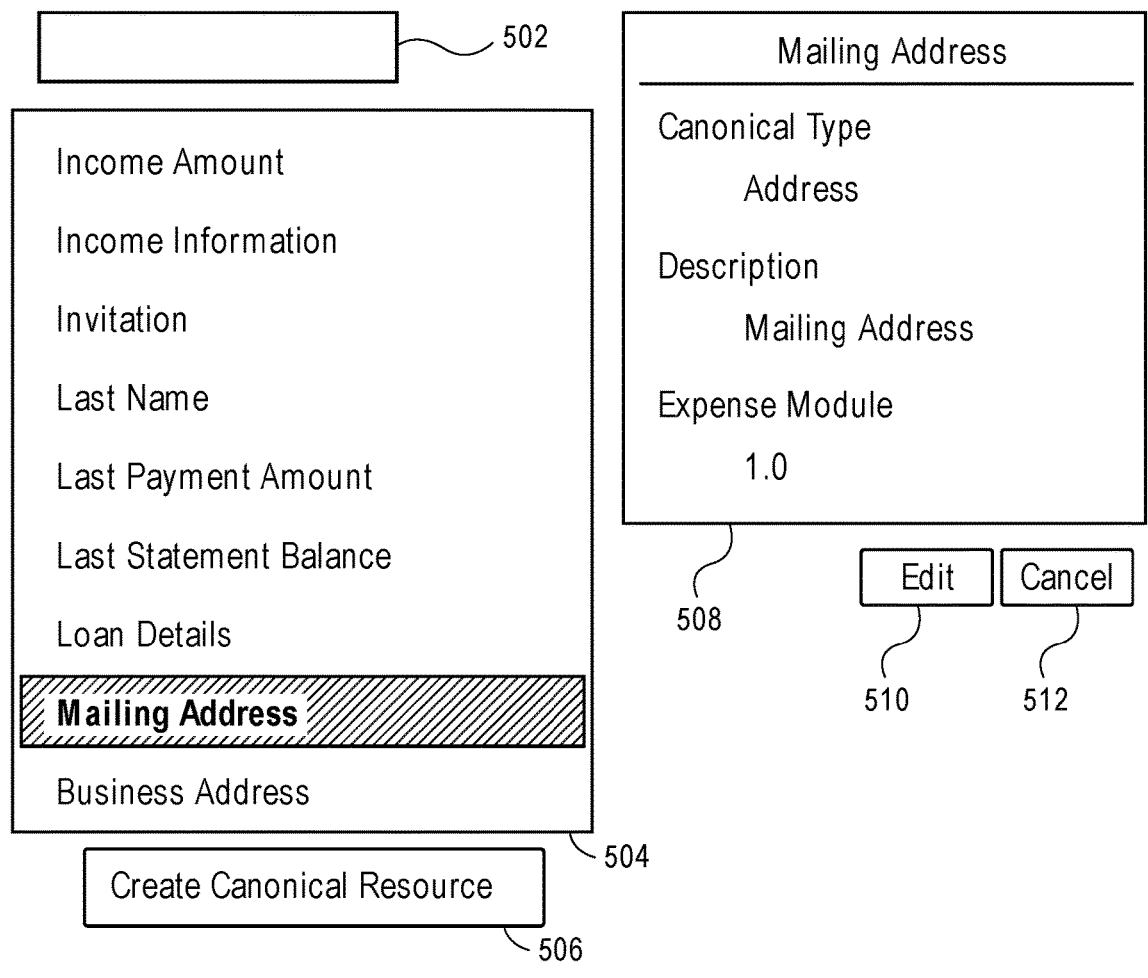
FIG. 5 depicts a user interface for administering canonical resources, according to an embodiment.

Turing to FIG. 5, an exemplary backend UI 500 for creating canonical resources is depicted, according to one embodiment. Backend UI 500 may include a search field 502, a canonical resources list 504, and a create canonical resource button 506. Search field 502 may be used to filter the list of canonical resources by title or any other criteria. Backend UI 500 may allow a user to select a canonical resource (e.g., "Mailing Address") from the list of canonical resources 504. UI 500 may include a selected canonical resource 508, which comprises a type, description, and other information. Edit and cancel buttons 510 and 512, respectively, may be provided to allow a user to make changes to the selected canonical resource 508. It should be appreciated that many other types of canonical types may be created, some of which may appear unintuitive. For example, tone of voice canonical type may be created that may be a spoken language (e.g., Spanish) or may refer to a demographic group (e.g., Chicagoans). The tone of voice may be altered by experience module 132, in some embodiments. The orientation of text (right-to-left) may be modified, according to some embodiments. In some embodiments, canonical resources may be created and deleted in the same way that paths and steps may be, as discussed above.

With regard to FIG. 6, an exemplary backend UI 600 for editing canonical resources is depicted, according to an embodiment. Backend UI 600 may include a name 604, description 606, required indicator 608, and implementation class 610. Required indicator 608 may be used to specify whether the canonical type will be required, by default, when being used as a step parameter. Step parameters are discussed further with respect to FIG. 7. The name 604 and description 606 may be used to refer to the canonical type corresponding to backend UI 600. For example, name 604 may read "Mailing Address" if the selected canonical resource in canonical resources list 504 is selected. Backend UI 600 may be displayed if either create canonical resources 506 or edit button 510 is activated by the user. Implementation class 610 may be a code class in an object-oriented programming language which defines canonical type. For example, implementation class 610 may be a complex (e.g., nested or structured) data type. Implementation class 610 may include one or more class constructors, which validate inputs at the time the canonical type is created. Implementation class 610 may also include facilities for handling constructor errors, as well as for converting canonical types to request/query contexts and vice versa. In some embodiments, canonical resources may be updated in the same way that paths and steps may be, as discussed above.

Turing to FIG. 7, an exemplary backend UI 700 for managing step parameters is depicted, according to an embodiment. Backend UI 700 may include a title 702, step parameters list pane 704, an add parameters pane 706, and a step details pane 708. The foregoing panes may correspond to the panes depicted in step display 210, in some embodiments. Add parameters pane 706 may include a plurality of fields, including a name field 710, a canonical field 712, and a required field 714. Canonical type 712 may correspond to the canonical type depicted in backend UI 600. That is, canonical types that are created may be later used as step parameters. Upon pressing a save button 716, a user may associate one or more step parameters with a step parameter. A step's parameters may define the inputs that a step may accept for processing by the step logic. By selecting the "required" checkbox depicted in backend UI 700, a user may determine whether the step parameter being added to the step will be required in order for the step to complete. If checked, the step cannot complete until the canonical type 714 is able to validate its input. In the example depicted in FIG. 7, the step would require an authorized user as input. It should be appreciated that many step parameters may be created.

Figure 8:
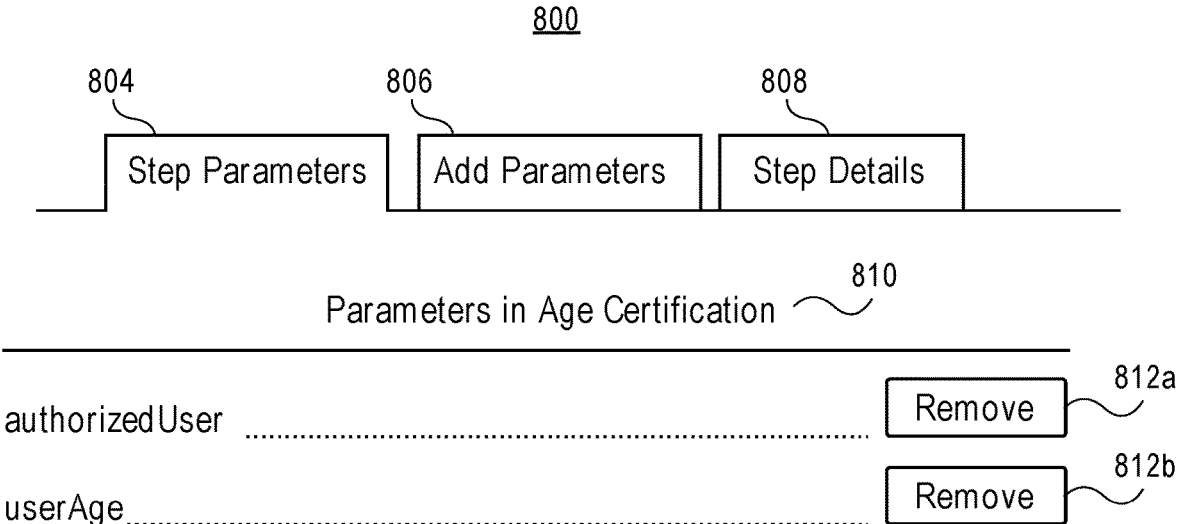
FIG. 8 depicts a user interface for administering step parameters.

Turning to FIG. 8, an exemplary backend UI 800 for listing step parameters is depicted, according to an embodiment. Environment 800 may include an add step parameters pane 804, a step parameters list pane 806, and a step details pane 808. Add step parameters 806 may correspond to backend UI 700. Environment 80 may include a step parameters list 810, which may comprise one or more parameters 812a-812b. Parameters 812a-812b may be of any number, and their ordering in parameters list 810 may determine their evaluation order. For example, in backend UI 800, a path evaluating/executing the depicted step may first determine whether the user is authorized and then check the user's age. As discussed above, steps may contain code or logic and return certain values based on the execution of parameters that they are provided with. For example, the path depicted may be "Age Certification" as shown in step parameters list 810 title, and may contain code which specifies that if the parameters 812a and 812b are provided, and each returns an expected value (true) then the step should overall evaluate to true, indicating that age of the user corresponding to parameters 812a and 812b has been certified by the step. It should be appreciated that there are many ways to configure steps to analyze inputs and return values based on those inputs, and that the analysis may vary based on the application of the step. Therefore, internally, steps may use code, truth tables, and any other suitable means for checking parameter values.

IV. Example Dynamic UX Applications Diagram

Figure 9:
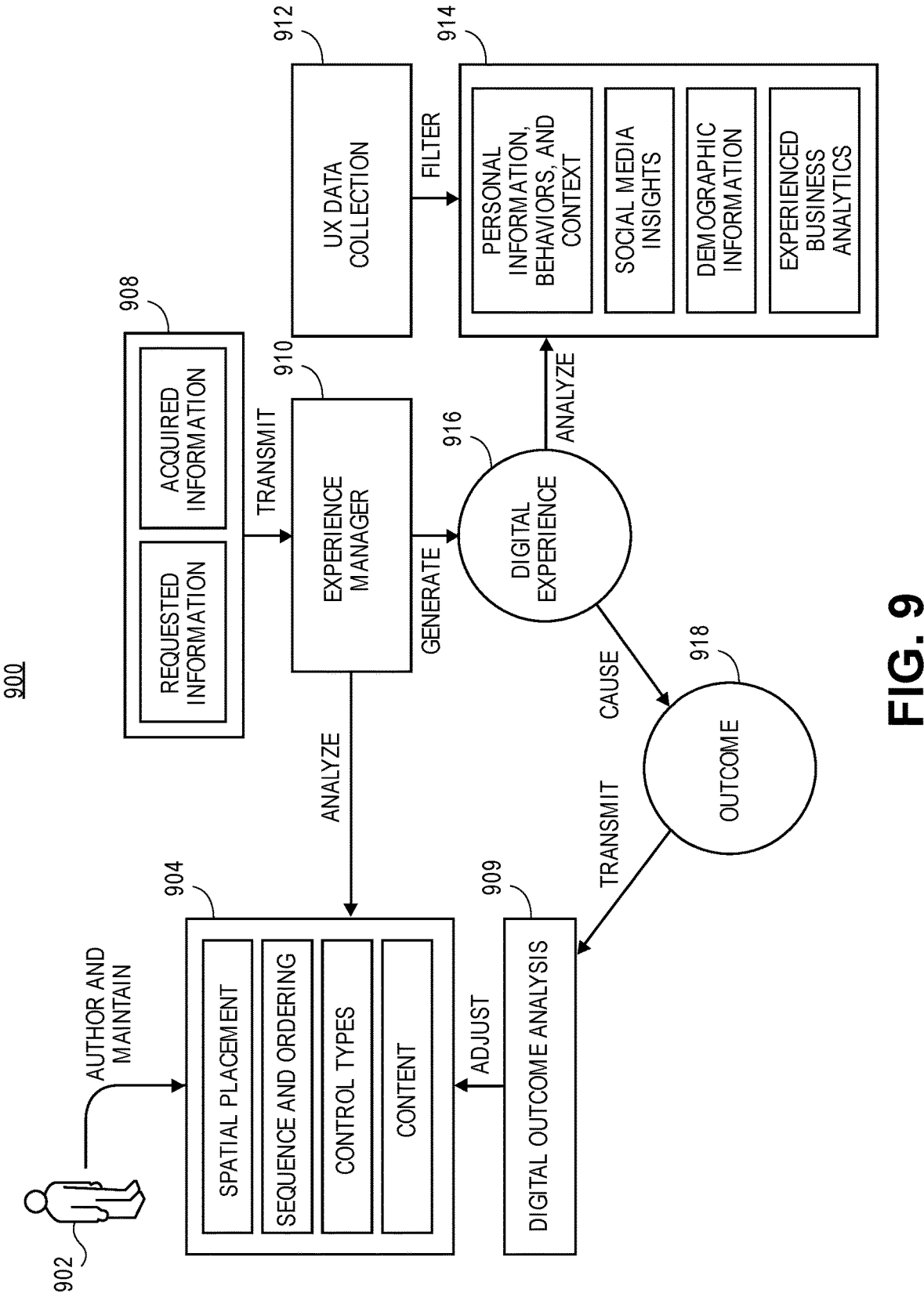
FIG. 9 depicts a flow diagram for administering dynamic user experience applications according to an embodiment and scenario.

FIG. 9 depicts an exemplary flow diagram environment 900 for managing dynamic user experience applications, according to one embodiment and scenario. Environment 900 may include a user 902 who may author, maintain, and/or manage a number of user experience rules affecting user experience 904. Such rules, governing default user experience, may be editable by a user using a user experience editor, not depicted. User may correspond to the user of mobile computing device 104. Environment 900 may include requested information and acquired information 908, which may be transmitted by a client (e.g., client 104)

and received in a device executing an experience manager 910 (e.g., server 102). Environment 900 may also include UX data collection module 912, which may filter UX data to determine UX data 914. Environment 900 may include digital experience module 916, which analyzes UX data 914 to cause UX outcomes 918 to be transmitted to digital outcomes analysis module 920, which may, in turn, have the effect of adjusting user experience 904.

UX data collection module 912 may be included in an application such as application 168. For example, if application 168 is a mobile application packaged and downloaded by a user (e.g., via a third party app store), then when application 168 is executing in mobile computing device 104, application 168 may include instructions to collect UX data 914. UX data 914 may include the personal information of the user. For example, the information that the user inputs into application may be collected. In some embodiments, user consent or opt-in may be required before such inputs may be collected. UX data may also include behaviors of the user, and context. For example, actions the user takes while using the application, such as mouse movement, and the succession of links or pages the user interacts with within the application may be collected. Context may include a referring link, whether the user was using a mobile device or was located at home, etc. UX data 914 may include demographic information about the user, including the user's location, age, etc. UX data 914 may also include experience and/or business analytics. For example, purchases made by the user and user session information (e.g., page impressions, page load times, etc.) may be collected. Once collected, UX data 914 may be stored in an electronic database that may be, in some embodiments, communicatively coupled to experience manager 910.

V. Example User Interface for Administering Hierarchical Dynamic UX Applications Turning to FIG. 10, a hierarchical workflow editing environment 1000 is depicted, according to an embodiment. Hierarchical workflow editing environment 1000 may include a list of steps 1002, each of which may correspond to, for example, the Age Certification step in FIG. 8, and any of the steps depicted in steps list 1012 of FIG. 2. The list of steps 1002 may include steps 1004a-1004e, wherein step 1004c has been selected by the user. As shown, a step of a given type ("rewards program") may be represented by multiple versions. Workflow editing environment 1000 may also include a path editor 1020, and step actions 1030a-1030d. Path editor 1020 may correspond to a single workflow and may be represented by a tree wherein each node corresponds to a step. The tree may have levels 1022i-1022z, wherein the depth can be of any number. The tree may have a root step 1024p, which may be the first step that is executed when the path is executed. As the root step 1024p is executed, it may branch into three additional steps, depending on logic included in root node 1024p. The tree may also include a self-referential step 1024r, a terminating or leaf step 1024u, and a horizontal step 1024s. In a horizontal step, a step at a given level may pass control to its neighbor. Similarly, the tree may contain cycles, as there may be backlinking steps such as step 1024t. Logic within steps may have access to step parameters via a special variable, which may be a hash or dictionary. For example, a step may access its parameters by referencing $STEP_PA-RAMETERS, which may be a global variable containing a hash map or other suitable data structure of each of the inputs passed as parameters to the step. Each individual parameter may be associated with a canonical type, which may be available to the user. For example, a user may write step logic within a step that is able to programmatically determine that an Age parameter was passed to the step, that the Age value is a primitive integer value (e.g., 31), and that the CanonicalType of the Age parameter is UserAge. As described, canonical types may correspond to external object-oriented classes/functions, and may include complex (i.e., non-primitive) data types (e.g., instantiated objects or references thereto).

A user may define all of the step types, and the directions between steps, by placing steps from the list of steps 1002 into the path editor 1020, and making step connections. A user may make step connections, which are depicted by arrows in step editor 1020, by selecting a step (e.g. by clicking on the step or otherwise actuating the step) and dragging or moving the selected step to another step. Step editor 1020 may allow a user to add logic to a step, by selecting a step. Selecting a step may open a step logic editor, into which code or other instructions may be added by the user. Path 1020 editor may automatically connect steps in response to user selections. A user may activate step actions 1030a-1030d to, respectively, add, clone, validate, and test steps. Add step 1030a may add a new into the path editor 1020 for the user to edit. Clone step 1020b may copy or clone an existing step, from either the path being edited in step editor 1020 or, in some embodiments, steps associated with other paths or which are not associated with any paths. Validate step 1030c may execute code that checks the step according to validation rules. For example, required fields may be checked to determine whether the fields respectively contain values that are within acceptable ranges. In some embodiments, custom validations may be added on a step-by-step basis. Test step 1030d may execute one or more of the steps individually; including the logic contained within each step, and may follow any step connections to other steps, which may also be executed. If a step requires step parameters, then the user may be prompted to type in the step parameters, individually or as a group, and the step provided with the input as parameters. In this way, a user may iteratively test a step as the user adds parameters and logic to the step. It should be appreciated that although steps are depicted above as being arranged linearly in a path, or in a tree data structure in a path, steps may be arranged in any suitable spatial arrangement to facilitate dynamic user experience application data flow.

VI. Example of Administering Dynamic User Experience Application Data Flow

Figure 10:
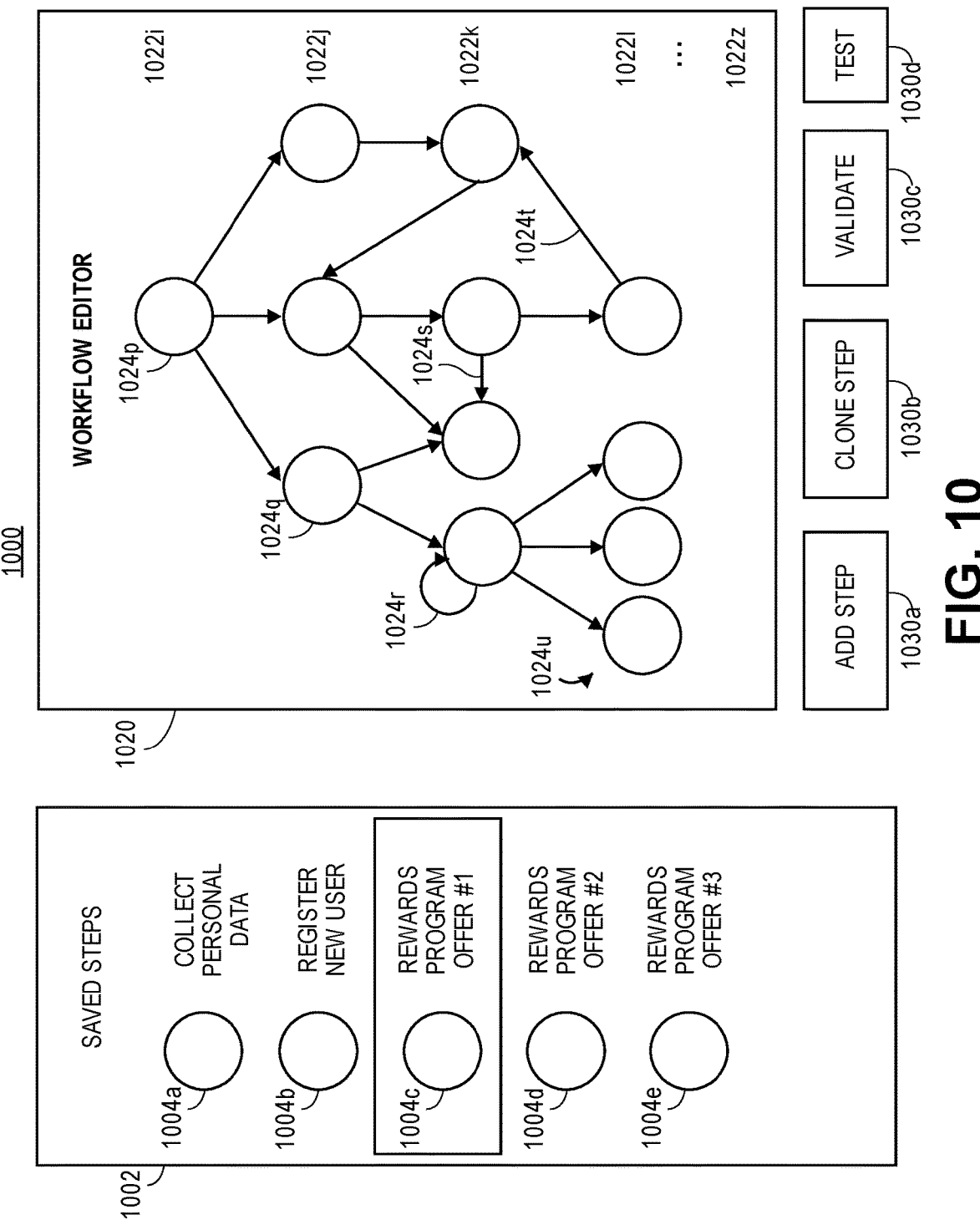
FIG. 10 depicts a user interface diagram for administering dynamic user experience applications, according to an embodiment and scenario.
Figure 11A:
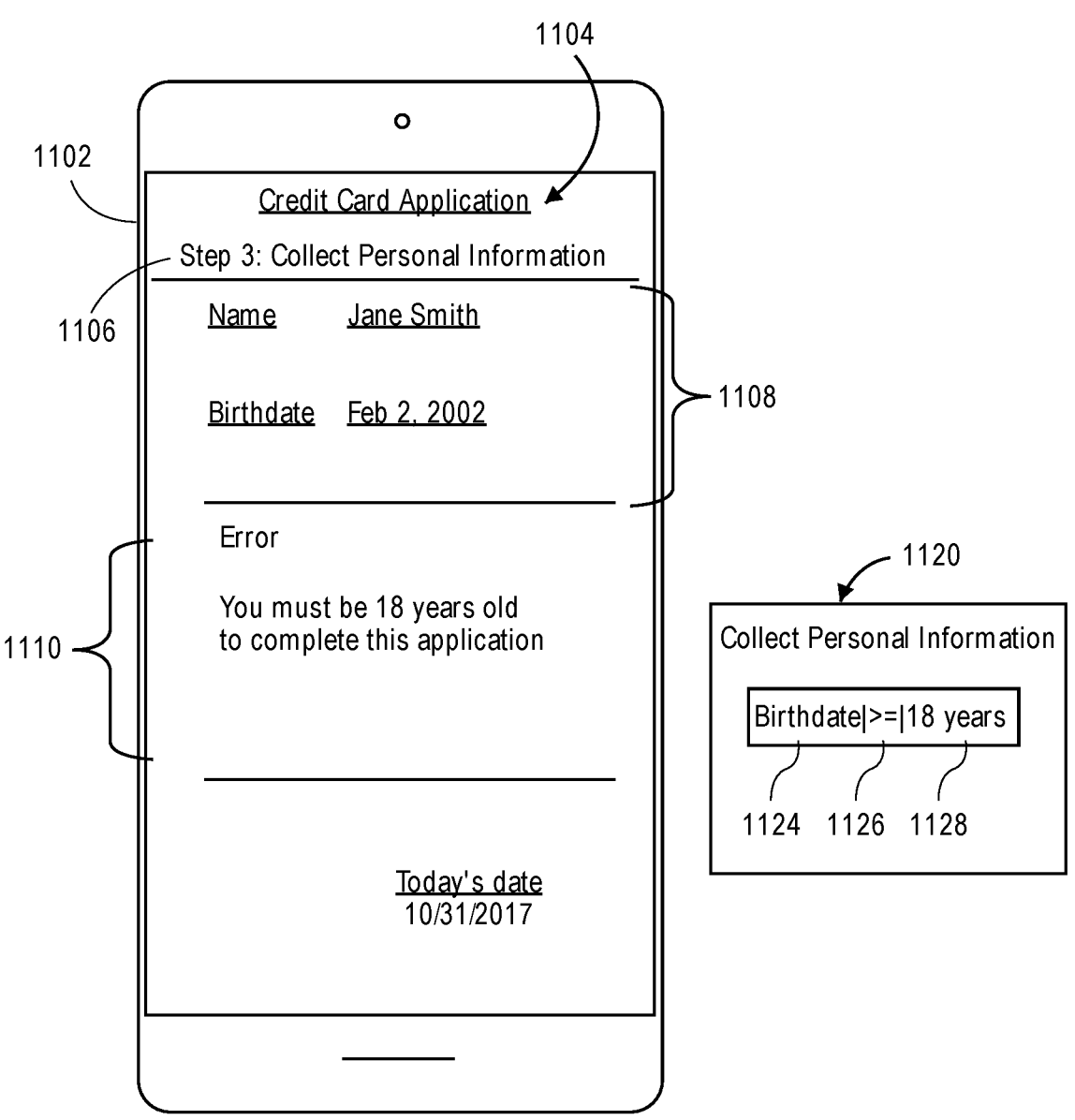
FIG. 11A depicts an example environment for invalid dynamic user experience application data flow, according to one embodiment.

With respect to FIG. 11A, an example environment 1100 for administering dynamic user experience application data flow is depicted, according to one embodiment. Once a first user has administered a path/workflow as described above (e.g., with respect to FIG. 2 and FIG. 10), a second user (who may be the same as the first user) may access the path. In some embodiments, the user may access the path via a dynamic user experience application. For example, the first user may access a workflow module that may correspond to workflow module 126, from a first application. The first application may correspond to application 122 or application 168. That is, the user may configure paths, steps, canonical resources, etc. as described above. Then, a second user may open an application (e.g., application 168 or application 122) and submit a request to perform a task. For example, the user may request a credit card application. Based upon the second user's request, the workflow module 126 may generate a dynamic UX application, and transmit the application to the user's device. The application may be generated by experience module 132 or another module. Experience module may contain instructions for executing a path and its associated steps to produce a corresponding dynamic UX application. The dynamic UX application may include user interfaces, user interface components, executable scripts, and other objects (e.g. text and images) corresponding to the steps of the dynamic UX application. Once the dynamic UX application or a portion of the dynamic UX application is loaded into an application accessed by the second user, the dynamic UX application or a portion thereof may be displayed in a display (e.g., display device 152) and the second user may interact with the displayed dynamic UX application via an input device (e.g., input device 150).

FIG. 11A may include a user device 1102 which may correspond to mobile computing device 104. Mobile computing device 104 may include a dynamic UX application 1104, which may be displayed when the application opens or upon the user taking an action. In the depicted embodiment, the user may have completed the first two steps of a Credit Card Application path, as shown by step status 1106. Step status 1106 may be a pointer to the current step, and may point to any step from step 1 to step n, wherein step n is the last step in a given path, where a path includes a linear path. In a hierarchical path, as shown in FIG. 10, step status 1106 may be an index into a tree or another suitable data structure (e.g., a node including a pair of pointers in a linked list). Environment 1100 may also include a step input fieldset, which may include a list of steps 1108, which may correspond to step list 214.

Environment 1100 may also include a step error field 1110 and an exemplary step 1120 including an example step parameter corresponding to a canonical type 1124. The first user may have configured the step 1120 to include custom validation code/logic as discussed above. For example, step logic may include an indication of a canonical type 1124, an operator 1126, and an operand 1128. Based on an event, such as a user typing a validly-formatted date into the Birthdate field of input fieldset 1108, step logic of step 1120 may be executed with the validly-formatted date. In the depicted embodiment, the validly-formatted date is Feb. 2, 2002 and the current date is Oct. 31, 2017. The validly-formatted date may be compared to the current date by the step logic of step 1120, and the result of the difference compared using operator 1126 to operand 1128. When the step logic evaluates to false, as it would in the depicted embodiment, error field 1110 may be displayed, informing the user that the path cannot proceed, and providing a rationale. Error rationale may, in some embodiments, be associated with each logical expression in step 1120. It should be appreciated that the logic depicted in step 1120 is merely exemplary, and may be configured in other ways depending on the needs of the input being validated and/or processed.

Figure 11B:
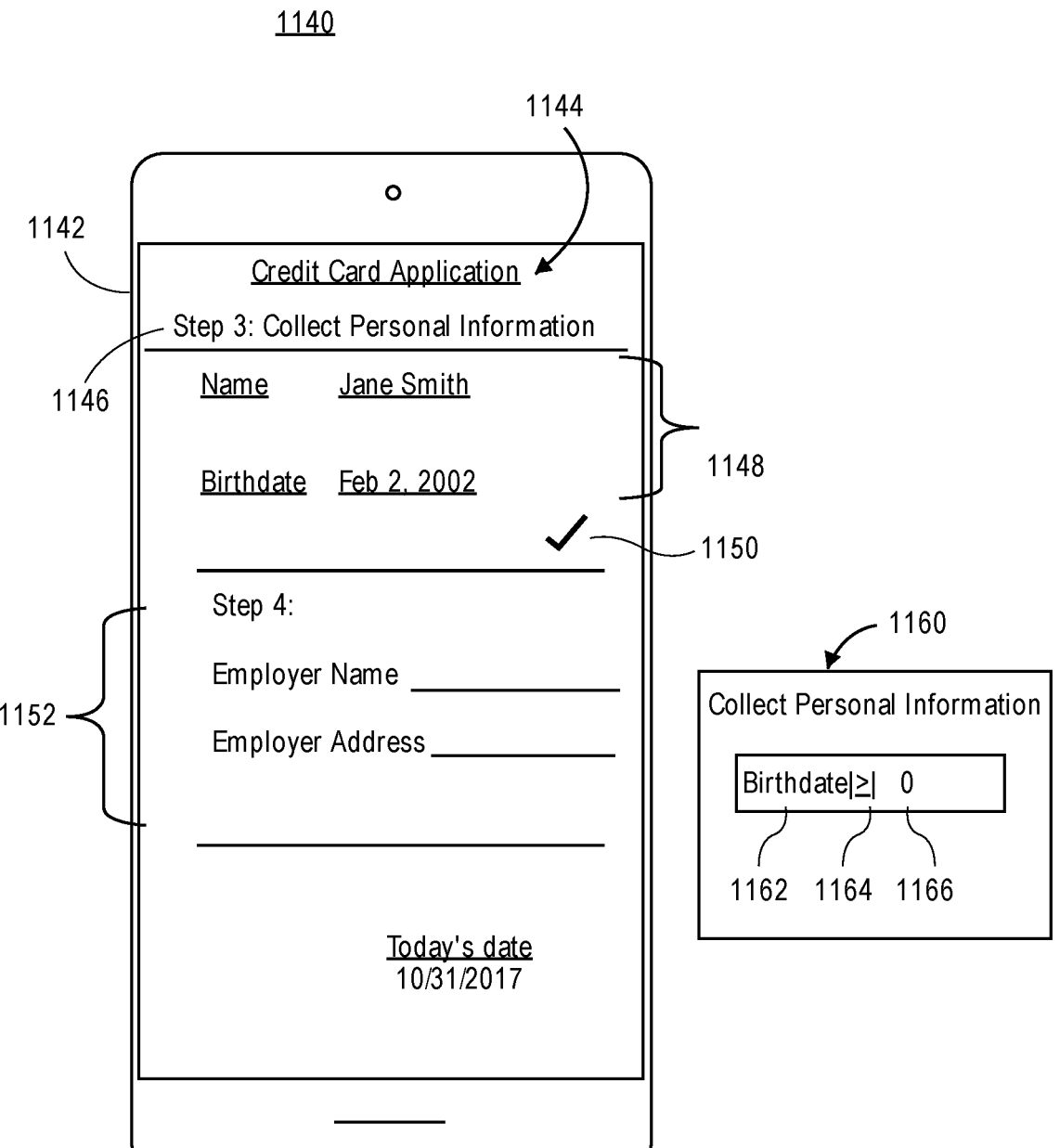
FIG. 11B depicts an example environment for valid dynamic user experience application data flow, according to one embodiment.

With respect to FIG. 11B, an example environment 1140 for administering dynamic user experience application data flow is depicted, according to one embodiment. Once a first user has administered a path/workflow as described above (e.g., with respect to FIG. 2 and FIG. 10, and FIG. 11A), a second user (who may be the same as the first user) may access the path. In some embodiments, the user may access the path via a dynamic user experience application. For example, the first user may access a workflow module that may correspond to workflow module 126, from a first application. The first application may correspond to application 122 or application 168. That is, the user may configure paths, steps, canonical resources, etc. as described above. Then, a second user may open an application (e.g., application 168 or application 122) and submit a request to perform a task. For example, the user may request a credit card application. Based upon the second user's request, the workflow module 126 may generate a dynamic UX application, and transmit the application to the user's device. The application may be generated by experience module 132 or another module. Experience module may contain instructions for executing a path and its associated steps to produce a corresponding dynamic UX application. The dynamic UX application may include user interfaces, user interface components, executable scripts, and other objects (e.g. text and images) corresponding to the steps of the dynamic UX application. Once the dynamic UX application or a portion of the dynamic UX application is loaded into an application accessed by the second user, the dynamic UX application or a portion thereof may be displayed in a display (e.g., display device 152) and the second user may interact with the displayed dynamic UX application via an input device (e.g., input device 150).

FIG. 11B may include a user device 1142 which may correspond to mobile computing device 104. Mobile computing device 104 may include a dynamic UX application 1144, which may be displayed when the application opens or upon the user taking an action. In the depicted embodiment, the user may have completed the first two steps of a Credit Card Application path, as shown by step status 1146. Step status 1146 may be a pointer to the current step, and may point to any step from step 1 to step n, wherein step n is the last step in a given path, and where a path includes a linear path. In a hierarchical path, as shown in FIG. 10, step status 1146 may be an index into a tree or another suitable data structure (e.g., a node including a pair of pointers in a linked list). Environment 1100 may also include a step input fieldset, which may include a list of steps 1108, which may correspond to step list 214.

Environment 1100 may also include a step error field 1150 and an exemplary step 1160 including an example step parameter corresponding to a canonical type 1162. The first user may have configured the step 1160 to include custom validation code/logic as discussed above. For example, step logic may include an indication of a canonical type 1162, an operator 1164, and an operand 1166. Based on an event, such as a user typing a validly-formatted date into the Birthdate field of input fieldset 1148, step logic of step 1160 may be executed with the validly-formatted date. In the depicted embodiment, the validly-formatted date is Feb. 2, 2002 and the current date is Oct. 31, 2017. As in FIG. 11A, the validly-formatted date may be compared to the current date by the step logic of step 1160, and the result of the difference compared using operator 1164 to operand 1166. When the step logic evaluates to true, as it would in the depicted embodiment, success indicator 1150 may be displayed, and informing the user that the path may proceed to the next step, providing the next step in input fieldset 1152. As the user continues to provide input that validates, successive steps/paths may be displayed. It should be appreciated that the logic depicted in step 1160 is merely exemplary, and may be configured in other ways depending on the needs of the input being validated and/or processed.

Figure 12:
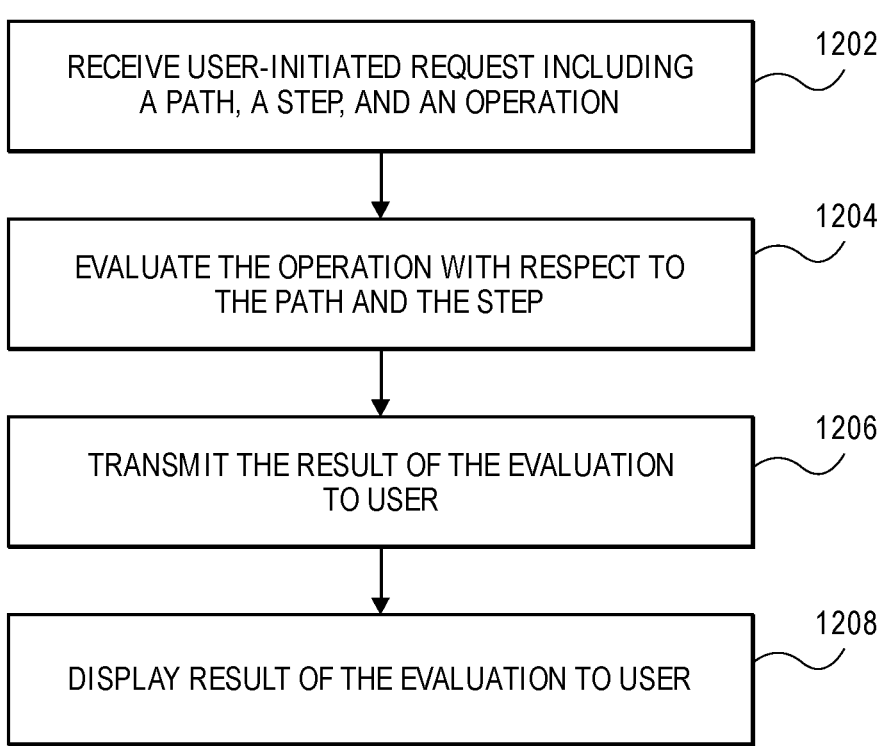
FIG. 12 depicts an example method for administering dynamic user experiences, according to an embodiment.

Turning to FIG. 12, an example method 1200 for administering dynamic user experiences is depicted, according to an embodiment. Method 1200 may include receiving a user-initiated request including a path, a step, and an operation (block 1202). In some embodiments, a set of paths may be received, wherein each path in the set of paths is associated with a respective set of steps and a one or more operations. In this way, modifications to multiple paths/steps may be batched in a client such as client 102 and transmitted to a server (e.g. server 104) for processing. The method may include evaluating the operation with respect to the path and the step, or the set of paths and associated steps as described above (block 1204). The operation may be any suitable operation, such as creating, deleting, updating, etc. The means by which the operation is performed may vary according to the applicable storage backend(s). For example, the operation(s) may be performed by an object-relational mapper (ORM) if, for example, the paths and associated steps are stored in an electronic database, such as an SQL or key-value store. In some embodiments, a flat file or other storage backend may be used, and the operations may be executed by specialized code. The method may include transmitting the result of the evaluation to the user (block 1206). For example, if a step is deleted from a workflow A, then the modified workflow A may be transmitted to the user. Transmission may be performed by a communication interface such as communication interface 134, a wired/wireless network such as network 106, and a communication module such as communication module 164. In some embodiments, transmission may be performed via asynchronous Javascript and XML (AJAX) over HTTP. In this way, portions of an application or web page may be updated without the need to download an entire web page. In some embodiments, the evaluation and transmission of the result of the evaluation may be inter-device, such as wherein the entire method is performed within mobile computing device 104. The method may include displaying the result of the evaluation to the user (block 1208). For example, the updated workflow and associated steps may be displayed in a user display device such as display device 152. In this way, a user may be apprised of the modifications that the user has caused to be made to the workflow and steps in an intuitive, visual way.

Additional Considerations

With the foregoing, any users (e.g., insurance customers) whose data is being collected and/or utilized may first opt-in to a rewards, insurance discount, or other type of program. After the user provides their affirmative consent, data may be collected from the user's device (e.g., mobile device, smart vehicle controller, or other smart devices). Of course, deployment and use of neural network models at a user device (e.g., the client 202 of FIG. 2) may have the benefit of removing any concerns of privacy or anonymity, by removing the need to send any personal or private data to a remote server (e.g., the server 204 of FIG. 2). In such instances, there may be no need for affirmative consent to be collected.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining." "presenting," "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for a system and method for administering dynamic user experience applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A method of administering dynamic applications, the method comprising:

receiving, by a computing system, a first input from an electronic device, the first input identifying a path comprising a sequence of steps to be performed;

providing, by the computing system and to the electronic device, based on the first input, a configuration parameter corresponding to the path;

receiving, by the computing system, a second input from the electronic device, the second input indicating a requested change to the configuration parameter;

modifying, by the computing system and based on the second input, the configuration parameter in accordance with the requested change, the modified configuration parameter indicating:

a first entity permitted to create a software application that is executable to perform the sequence of steps included in the path, wherein the application is executable, after creation, by a device of one or more second entities, different from the first entity, to complete the sequence of steps, and a period of time during which one or more instances of the application can be created by the first entity, the computing system prohibiting the creation of the application after expiry of the period of time;

transmitting, by the computing system, an output to the electronic device, the output causing the electronic device to provide a user interface indicating the modification of the configuration parameter in accordance with the requested change;

receiving, by the computing system and from a first device associated with the first entity, a request to create an instance of the application;

determining, by the computing system, that the period of time has not expired;

based on the request, and on determining that the period of time has not expired, creating a first instance of the application; and providing, by the computing system, the first instance of the application to the first device.

2. The method of claim 1, further comprising:

receiving, by the computing system and from the electronic device, a third input indicating an operation associated with the sequence of steps; and modifying, by the computing system and based on the operation, at least one step of the sequence of steps, wherein the modification includes at least one of (a) creating, (b) retrieving, (c) updating, or (d) deleting the at least one step of the sequence of steps.

3. The method of claim 2, wherein updating the at least one step includes:

modifying a display order of an output of performing the at least one step.

4. The method of claim 2, wherein creating the at least one step of the sequence of steps includes creating, based on the third input: step logic to be executed during execution of the at least one step, and one or more input fields corresponding to operands of the step logic.

5. The method of claim 2, wherein each step of the sequence of steps include one or more respective canonical resources, and wherein the modification further includes at least one of (a) creating, (b) retrieving, (c) updating, or (d) deleting the one or more respective canonical resources.

6. The method of claim 2, wherein modifying the at least one of the sequence of steps further includes creating an additional step, wherein the additional step includes validation logic executable to determine, based on an input received during performance of the additional step, whether a requirement of the path is satisfied.

7. The method of claim 1, wherein the configuration parameter is indicative of a security level of the path or a development status of the path.

8. The method of claim 1, wherein the second input includes one or more cryptographic keys corresponding the path, the method further comprising:

determining, by the computing system, a match between the cryptographic keys and corresponding keys associated with the path.

9. The method of claim 1, further comprising:

receiving, by the computing system and from a second device associated with the first entity, a request to create an instance of the application implementing the path;

determining that the period of time has not expired; and providing by the computing system and to the second device, based on determining that the period of time has not expired, a second instance of the application comprising an additional executable software component including the executable components associated with the sequence of steps, the the second instance of the application being executable on the second device.

10. The method of claim 9, further comprising:

providing, by the computing system and to the second device, a third instance of the application, wherein the third instance of the application may be executed at a different time than the second instance of the application.

11. The method of claim 1, wherein each step of the sequence of steps further comprises properties required for performing the respective step and an internal state indicative of current values of the properties.

12. The method of claim 1, wherein a computing device of the one or more second entities is unable to execute the sequence of steps without creation of the application.

13. The method of claim 1, wherein the device of the one or more second entities is different from the first device and the electronic device.

14. The method of claim 1, wherein a user experience (UX) of the application is based at least in part on UX data collected from the device of the one or more second entities, wherein the UX data comprises:

information inputted into the application by the one or more second entities, a type of the device, and a location of the device.

15. A computing system, comprising:

one or more processors; and one or more memories storing instructions that, when executed by the one or more processors, cause the computing system to:

receive, a first input from an electronic device, the first input identifying a path comprising a sequence of steps to be performed;

provide, to the electronic device and based on the first input, a configuration parameter corresponding to the path;

receive, from the electronic device, a second input that identifies a requested change to the configuration parameter;

modify, based on the second input, the configuration parameter in accordance with the requested change, wherein the modified configuration parameter is indicative of:

a first entity permitted to create a software application that is executable to perform the sequence of steps included in the path, wherein the application is executable, after creation, by a device of one or more second entities, different from the first entity, to complete the sequence of steps, and a period of time during which one or more instances of the application can be created by the first entity, the computing system prohibiting the creation of the application after expiry of the period of time;

transmit, an output to the electronic device, the output causing the electronic device to provide a user interface indicating the modification to the configuration parameter;

receive, from a first device associated with the first entity, a request to create an instance of the application;

determine that the period of time has not expired;

based on the request, and on determining that the period of time has not expired, create a first instance of the application; and provide, to the first device, the first instance of the application.

16. The computing system of claim 15, wherein the instructions further cause the computing system to create or update one or more dependencies corresponding to a particular step of the one or more steps.

17. The computing system of claim 15, wherein the instructions further cause the computing system to:

create a tree data structure corresponding to the sequence of steps, wherein the tree data structure includes nodes that correspond to each respective step of the sequence of steps, and wherein each node may include one or both of a pointer to another node and a pointer to a leaf node, wherein executing the application comprises executing each node in the tree data structure according to a tree traversal algorithm.

18. The computing system of claim 15, wherein the request is a first request received at a first time, the instructions further cause the computing system to:

receive, from the first device, a second request to create an additional instance of the application at a second time after the first time;

determining that the period of time has not expired;

based on the second request, and on determining that the period of time has not expired, create a second instance of the application; and provide, to the first device, the second instance of the application.

19. The computing system of claim 15, wherein the request is a first request received at a first time, the instructions further cause the computing system to:

receive, from the first device, a second request to create an additional instance of the application at a second time after the first time;

determining that the period of time has expired; and provide, to the first device, an indication that an instance of the application cannot be created based on determining that the period of time has expired.

20. A non-transitory computer readable medium containing instructions that, when executed, cause a computing device to:

receive, a first input from an electronic device, the first input identifying a path comprising a first set of steps;

display, via an interface of the electronic device and based on the first input, a configuration parameter corresponding to the path;

receive, from the electronic device, a second input, the second input indicating a requested change to the configuration parameter;

modify, based on the second input, the configuration parameter in accordance with the requested change, wherein the modified configuration parameter is indicative of:

a first entity permitted to create a software application that is executable to perform the first set of steps included in the path, wherein the application is executable, after creation, by a device of one or more second entities, different from the first entity, to complete the first set of steps, and a period of time during which one or more instances of the application can be created by the first entity, the computing device prohibiting the creation of the application after expiry of the period of time;

display, via the interface of the electronic device, an output illustrating the modification;

receive, from a first device associated with the first entity, a request to create an instance of the application;

determine that the period of time has not expired;

based on the request, and on determining that the period of time has not expired, create a first instance of the application; and provide, to the first device, the first instance of the application.

\* \* \* \* \*